United States Patent
Mandal et al.

(10) Patent No.: US 6,772,178 B2
(45) Date of Patent: Aug. 3, 2004

(54) METHOD AND APPARATUS FOR MANAGING REMOTE DATA REPLICATION IN A DISTRIBUTED COMPUTER SYSTEM

(75) Inventors: Chhandomay Mandal, Nashua, NH (US); Peter J. Wagener, Somerville, MA (US); Mark J. Musante, Westford, MA (US); Jillian I. DaCosta, Nashua, NH (US); Lanshan Zhang, Andover, MA (US); Roberta A. Pokigo, Billerica, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 295 days.

(21) Appl. No.: 09/917,145

(22) Filed: Jul. 27, 2001

(65) Prior Publication Data

US 2003/0033327 A1 Feb. 13, 2003

(51) Int. Cl.[7] .............................................. G06F 17/00
(52) U.S. Cl. ........................ 707/204; 707/10; 707/200; 709/217; 709/220; 709/223
(58) Field of Search ...................... 707/10, 200, 204; 709/226, 201, 203, 217, 220, 223, 316; 711/162, 203; 714/5

(56) References Cited

U.S. PATENT DOCUMENTS

| | | | |
|---|---|---|---|
| 6,002,085 A * | 12/1999 | Utsumi et al. ................. 174/28 |
| 6,058,401 A * | 5/2000 | Stamos et al. ................ 707/201 |
| 6,453,326 B1 * | 9/2002 | Parham et al. ................ 707/204 |
| 6,571,232 B1 | 5/2003 | Goldberg et al. ............... 707/2 |
| 6,625,613 B2 * | 9/2003 | Thompson .................. 707/102 |
| 2003/0014432 A1 * | 1/2003 | Teloh et al. ................. 707/204 |
| 2003/0014433 A1 | 1/2003 | Teloh et al. ................. 707/204 |
| 2003/0014523 A1 * | 1/2003 | Teloh et al. ................. 709/226 |
| 2003/0033327 A1 * | 2/2003 | Mandal et al. ............... 707/204 |
| 2003/0061399 A1 * | 3/2003 | Wagener et al. .............. 709/321 |
| 2003/0074446 A1 * | 4/2003 | Musante et al. .............. 709/224 |
| 2003/0084116 A1 * | 5/2003 | Musante et al. .............. 709/217 |
| 2003/0084198 A1 * | 5/2003 | Mandal et al. ............... 709/316 |
| 2003/0088713 A1 * | 5/2003 | Mandal et al. ............... 709/328 |
| 2003/0105840 A1 * | 6/2003 | Mandal et al. ............... 709/220 |

OTHER PUBLICATIONS

Kyeongho et al., "Scheduling of storage and cache servers for replicatied multimedia data", IEEE, pp. 484–487, 1997.*
Bhide et al., "Implicit replication in a network file server", IEEE, pp. 85–90.*
Cai et al., A new medium access control for multi-channel Ad Hoc networks; IEEE, pp. 966–971.*
Makpangou et al., "Replicated directory service for weakly consistent distributed caches", ACN, pp1–9.*
Vason P. Srnin, "An architecture for extended abstract data flow", IEEE, pp. 303–325, 1981.
Madan et al., "A distributed real time database for heterogeneous computer controll systems", IEEE, pp. 435–440, 1995.
Pu et al., "Replica control in distributed systems", ACM, pp. 377–386, 1991.

\* cited by examiner

*Primary Examiner*—Jean M. Corrielus
(74) *Attorney, Agent, or Firm*—Kudirka & Jobse, LLP

(57) ABSTRACT

A three-tiered data replication management system is used on a distributed computer system connected by a network. The lowest tier comprises management facade software running on each machine that converts a platform-dependent interface written in low-level kernel routines that actually perform the data replication to platform-independent method calls. The middle tier is a set of federated Java beans, which communicate with each other, with the management facades, and with the upper tier of the system. The upper tier of the inventive system comprises presentation programs that can be directly manipulated by management personnel to view and control the system. The federated Java beans can run on any machine in the system and communicate via the network. A data replication bean runs on each host and at least one such bean communicates directly with a management interface that is controlled by a user.

22 Claims, 18 Drawing Sheets

| StorEdge Network Data Replicator | | | |
|---|---|---|---|
| Name | Type | State | Operational Status |
| MySet1 | Primary | Replicating | Normal |
| MySet2 | Primary | Logging | Normal |
| MyGroup | Secondary | Logging | Normal |

FIG. 7

METHOD AND APPARATUS FOR MANAGING REMOTE DATA REPLICATION IN A DISTRIBUTED COMPUTER SYSTEM

FIELD OF THE INVENTION

This invention relates to networked computer systems and to data replication and mirroring of data in distributed data storage devices that are connected by a network.

BACKGROUND OF THE INVENTION

It is common in many contemporary computer systems to require continuous access to stored information. The conventional data center procedure of taking data storage systems offline to update and backup information is not possible in these computer systems. However, system reliability demands the backup of crucial data and fast access to the data copies in order to recover quickly from human errors, power failures and software bugs. In order to recover from natural disasters, it is common to share data among geographically dispersed data centers.

The prior art has generated several solutions to meet the aforementioned data backup and sharing needs. One prior art solution is data replication in which a second copy or "mirror" of information located at a primary site is maintained at a secondary site. This mirror is often called a "remote mirror" if the secondary site is located away from the primary site. When changes are made to the primary data, updates are also made to the secondary data so that the primary data and the secondary data remain "synchronized."

Data replication can be performed at various levels. For example, the entire database may be mirrored. However, tight synchronization between the primary and mirrored data for an entire database often introduces a significant system performance penalty because of the large number of data update transmissions between the primary and secondary sites that are necessary to ensure transaction and record consistency across the entire database.

To improve system performance when data replication is used, some data replication systems replicate only portions of the data. For example, replication may take place at file-level. Conventional file-level replication systems are often incorporated in the software drivers on the host and generally employ conventional networking protocols, such as TCP/IP, to connect to the remote data site over a local or wide area connection.

Alternatively, in other prior art systems, data replication takes place at the volume level, where a volume is a logical, or physical, disk segment. Instead of replicating database transactions or file systems, this technique replicates logical or, in some cases, physical disk volumes. Volume replication is flexible in the sense that it is generally independent of the file system and volume manager software. Volume replication can also be used in conjunction with database and file replication to help ensure that not just the data specific to the database or a particular file system, but all relevant data is replicated to the remote site.

There are principally two techniques commonly used for data replication: synchronous and asynchronous replication. Synchronous techniques forward data writes generated by the host to the remote site and await confirmation that the remote data has been updated before signaling I/O completion to the requesting host. Synchronous replication has the advantage that, if the primary site is rendered inoperative, the secondary (remote) copy may be used to continue operations after the user community and the applications are switched to the alternate site.

One problem with synchronous replication is that all data must be safely committed to the remote site before the local host write is acknowledged. Consequently, synchronous mirroring is generally limited to relatively short distances (tens of kilometers) because of the detrimental effect of round-trip propagation delay on I/O response times. In addition, if the remote storage is unavailable or the link between the local and remote sites is disabled for a prolonged time period, the host cannot complete its processing and business disruption occurs, even though the primary site has a perfectly operational system.

It is possible to avoid this problem, by maintaining the synchronous writes only when the remote site is available. If the remote site becomes unavailable, then the primary site keeps track of all data writes and the remote site is updated when the remote service is reliably restored. This approach trades recovery time in favor of higher data availability by eliminating the single point of failure produced by the remote storage site.

Alternatively, asynchronous replication methods can be used. Asynchronous techniques affirm primary I/O completion to the originating host before updating the remote data. However, if the link connecting the primary and secondary sites has significant latency, local writes must be queued at the primary site for later transmission when the site link is available. Consequently, in these situations, there is a higher possibility of losing buffered and in-flight data if the primary system fails. A non-volatile memory is needed to prevent data loss in this situation.

Occasionally, remote mirroring operations are interrupted either intentionally or by unplanned outages. If either the primary data or the secondary data continues to be updated during this period, then the data images are no longer synchronized. Resynchronization is the process of re-establishing mirrored images once the remote copy service is restored. Full resynchronization is accomplished by making a complete copy of the data and is time-consuming. One way to reduce resynchronization time is to log data changes during the interruption. Journals and scoreboards (bit-vectors) are two recognized ways to accomplish this logging. Journals designs capture every new write in a running log, whereas scoreboards keep track of changed locations.

No matter which of the data replication systems are used, a significant amount of management time can be consumed in initially setting up the data replication system and managing it after it is running. In particular, the data manipulation processes, which actually perform the data updates and synchronization, are typically low-level routines that are part of an operating system kernel running on a particular machine. These routines typically must run on that machine and are written in platform-dependent language. However, in a large, distributed computer system connected by a network, management personnel and resources may be physically located anywhere in the system. Thus, it becomes time-consuming to contact both the primary and secondary storage systems from what can be a remote location to ascertain if space in these systems is available, reserve the space in the respective systems, configure the low level routines to perform the data replication and then access a configuration database that can also be located anywhere on the network to record the particular data replication configuration so that other system managers will not attempt to use resources that have already been reserved.

Therefore, there is a need to provide a simple, fast way to set up and manage a data replication system among resources that may be located anywhere in a distributed system and to provide coordination information to a manager who may also be located anywhere in the system.

SUMMARY OF THE INVENTION

In accordance with the principles of the invention, a three-tiered data replication management system is used on a distributed computer system connected by a network. The lowest tier comprises management facade software running on each machine that converts the platform-dependent interface written with the low-level kernel routines to platform-independent method calls. The middle tier is a set of federated Java beans that communicate with each other, with the management facades and with the upper tier of the system. The upper tier of the inventive system comprises presentation programs that can be directly manipulated by management personnel to view and control the system.

In one embodiment, the federated Java beans can run on any machine in the system and communicate via the network. A data replication management facade runs on each host and at least one data replication bean also runs on the host. The data replication bean communicates directly with a management GUI or CLI and is controlled by user commands generated by the GUI or CLI. Therefore, a user needs to log onto only one machine in order to configure the entire data replication system.

In another embodiment, another bean stores the configuration of the data replication system. This latter bean can be interrogated by the data replication bean to determine the current system configuration.

In still another embodiment, a data services bean locates and prepares volumes that can be used by the data replication system.

In yet another embodiment the presentation programs include a set of management graphic user interfaces (GUIs)

In another embodiment, the presentation programs include command lines interfaces (CLIs).

BRIEF DESCRIPTION OF THE DRAWINGS

The above and further advantages of the invention may be better understood by referring to the following description in conjunction with the accompanying drawings in which:

FIG. 7 is a screen shot of a screen generated by a management GUI that allows a user to view SNDRSets and SNDRGroups and their present status

DETAILED DESCRIPTION

Figure 1:
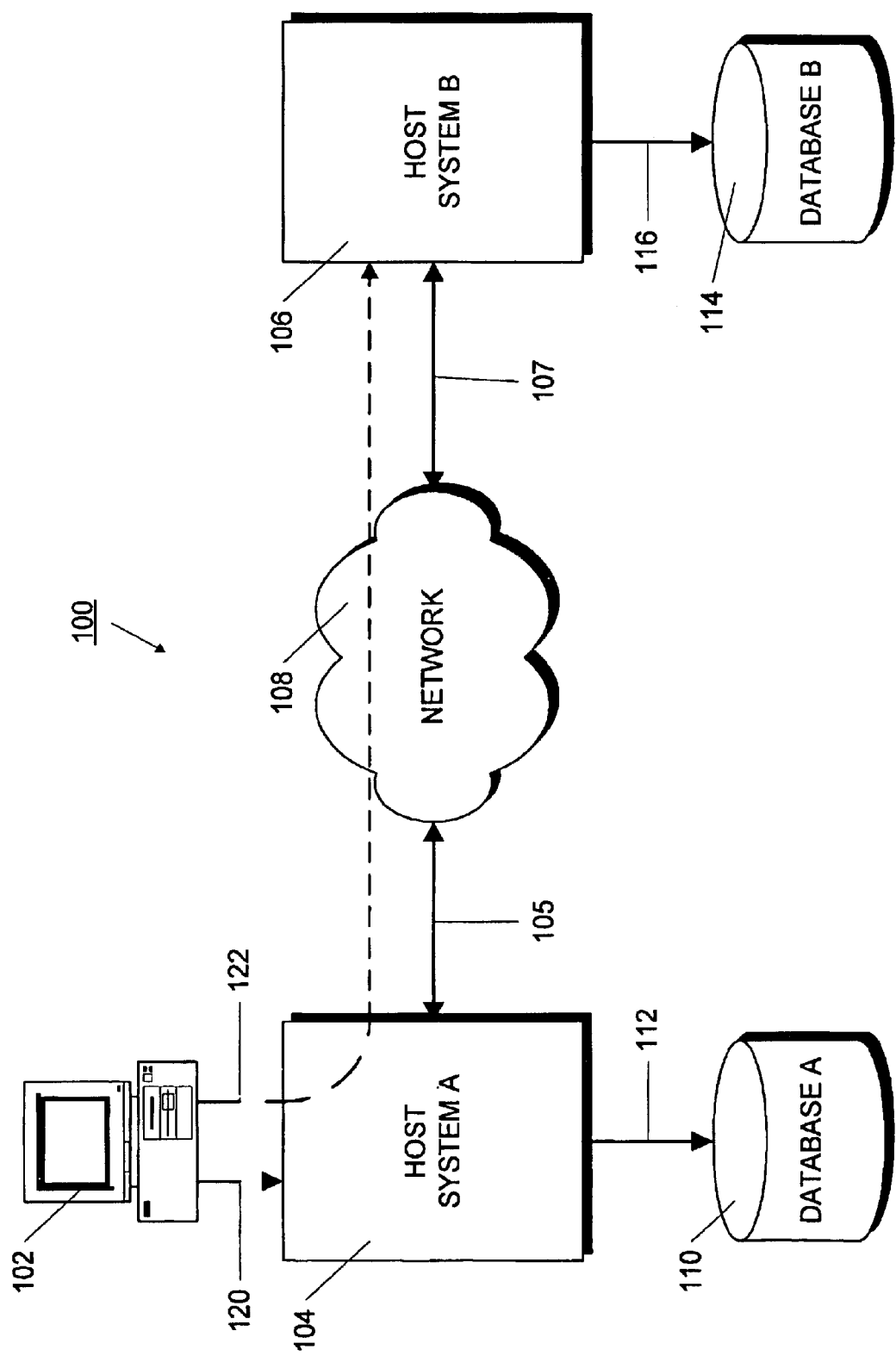
FIG. 1 is a block schematic diagram of a conventional data replication system.

FIG. 1 illustrates a conventional data replication system 100. In this system, a system manager represented schematically by console 102 is connected to a first host system (Host A) 104. Host A is, in turn, connected to a second host system (Host B) 106 by a network 108 as indicated schematically be arrows 105 and 107.

Each of the host systems 104, 106 has associated therewith a storage component. For example, host 104 has database component 110 associated with it, as indicated by arrow 112, and host 106 has database component 114 associated with it as indicated by arrow 116. Each host system 104, 106 can control the assignment of storage space and the transfer of information from and to its associated storage component 110, 114, respectively. As previously mentioned, data replication systems can replicate data at various levels including file, volume and database levels. However, in order to simplify the following discussion, it will be assumed that data replication is carried out at the volume level.

The data manipulation processes that actually perform the data updates and synchronization are low-level routines that are part of an operating system kernel running on both host systems 104 and 106. These routines typically must run on their respective machines and control the storage component that is associated with a machine. Thus, in prior art systems, in order to set up a data replication system in the configuration shown in FIG. 1, the manager would log onto host system A 104 as schematically indicated by arrow 120 and locate and reserve a volume in the storage component 110. This latter volume would be termed the primary volume. Then, the manager would log onto host system B 106, locate, and reserve a volume for the mirror volume in storage component 114. This latter volume would be deemed the secondary volume.

Next, the manager would start the data replication software in both host systems A and B so that data would be replicated from the primary volume in storage component 110 to the secondary volume in storage component 114, via the network 108. Thereafter, data replication takes place automatically, unless a failure is encountered. In that case, the manager would have to log onto both host systems 104, 106 and configure the data replication software to perform a volume synchronization as appropriate. Therefore, a significant amount of management time can be consumed in initially setting up the data replication system and managing it after it is running.

A data replication system constructed in accordance with the principles of the invention comprises three layers or tiers. The first, or upper, tier is a presentation layer with which the manager interacts at a single host location. The upper tier, in turn, interacts with the middle tier comprised of a plurality of federated beans, each of which performs specific tasks in the data replication system. The federated beans can communicate with each other both in the same host and in other hosts via a network connecting the hosts. Some of the beans can communicate with the lowest tier, which comprises the low-level routines that actually perform the data updates. In this manner an entire data replication system can be configured and managed from a single location. Using this system, data can be written to the both the primary and the secondary sites. The inventive data replication system allows data to be replicated in both synchronous and asynchronous modes over a network that uses the IP protocol. Hence, the network can use any medium, such as ATM, ISDN, Ethernet, gigabit-Ethernet, T1 and T3 lines and other conventional transmission systems.

Figure 2:
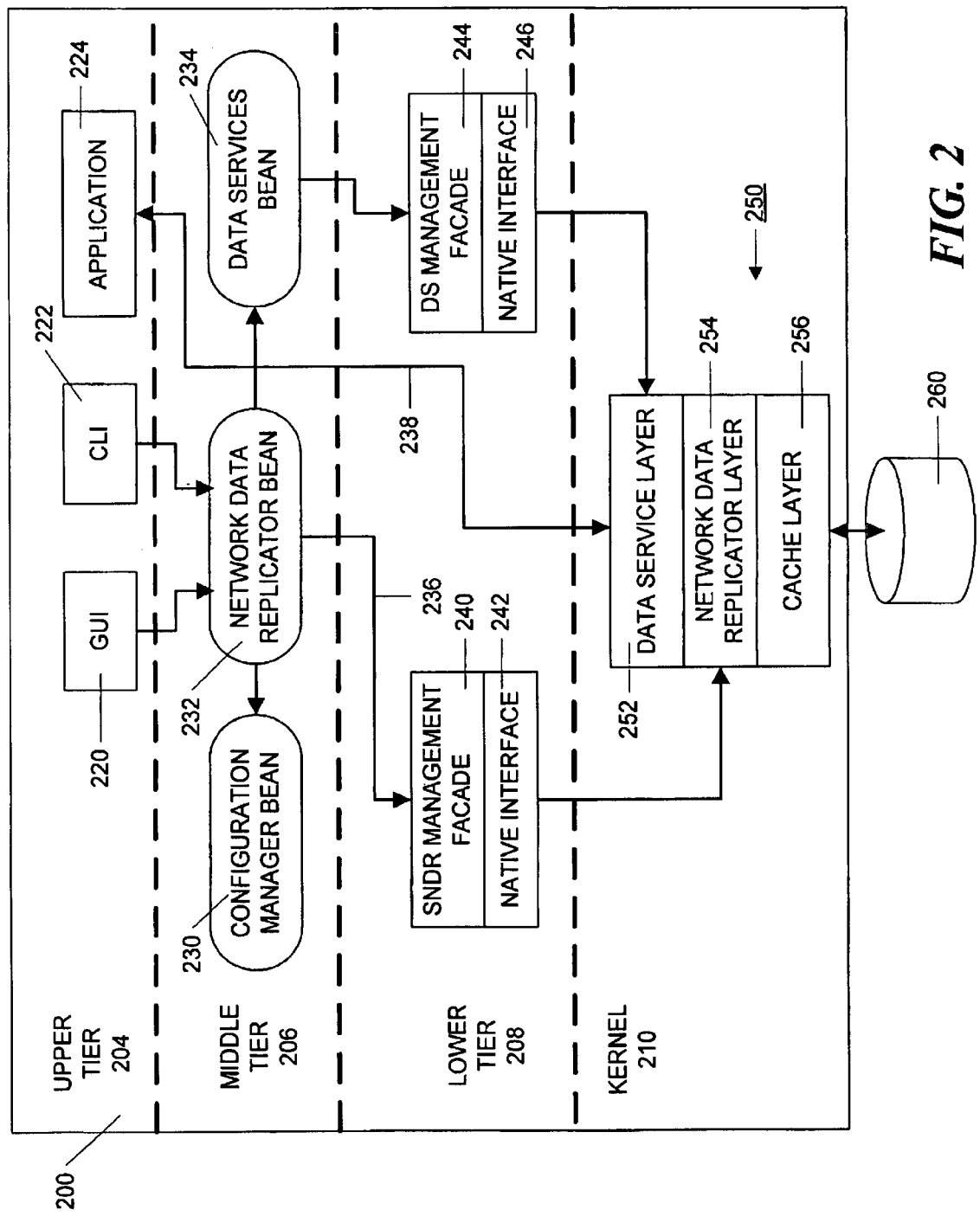
FIG. 2 is a block schematic diagram of a three-tiered data replication system in a single host, illustrating an upper presentation tier, a federated bean middle tier and a management facade lower tier.

FIG. 2 shows a host system 200 that illustrates the contents of the three tiers running in a single host. The inventive data replication system comprises three layers, or tiers: an upper tier 204, a middle tier 206 and a lower tier 208. The upper tier 204 is a presentation level which can be implemented with either a graphical user interface (GUI) 220 or a command line interface (CLI) 222, both of which are described in detail below. A manager interacts with this level, via the GUI 220 or CLI 222, in order to create, configure and manage a data replication system.

The middle tier 206 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html.

The federated beans use a distributed management framework that implements the FMA specification for distributed management of data replication. This framework is called the Jiro™ framework (trademark of Sun Microsystems, Inc.) and is developed by Sun Microsystems, Inc. Details of this framework are available in the "Jiro™ Technology SDK Programmer's Reference Manual" available at http:jiro.com, which manual is incorporated by reference in its entirety.

For data replication purposes, the main federated bean is the "StorEdge™ network data replicator bean" (SNDR bean). "StorEdge™" is a trademark of Sun Microsystems, Inc. As discussed below, in the process of managing a data replication system, the SNDR bean 232 uses other beans that may be located on the same, or different, machines. These beans include the configuration manager federated bean 230 and a data services federated bean, such as bean 234. Other beans, not shown in FIG. 2, may also be used. The beans 232, 234 and 236 can communicate with each other. In addition, the GUI 220 and the CLI 222, which are part of the presentation layer 204, communicate with the SNDR bean 232 running in the host 200 where the GUI 220 and CLI 222 are running as indicated in FIG. 2.

The remote data mirroring capability of the invention is actually implemented in the kernel layer 210 shown running in host 200 in FIG. 2. In particular, access by the host 200 to a resource 260, which can be a data storage component, is provided by a layered stack 250 comprising a data service layer 252, an SNDR data service layer 254 and a cache layer 256. Application programs running in host 200, such as application 224, and the host file system access resource 260 though the layered stack 250 as indicated schematically by arrow 238.

Data replication is implemented by the SNDR layer 254, which is part of the kernel software of the operating system running in host 200. Accordingly, SNDR layer 254 would generally by implemented in platform-specific code, for example, in C routines. Layer 254 exposes application programmer interfaces (APIs) that can be accessed only from the host 200 in which SNDR layer 254 is installed. In order to provide for remote management capability in accordance with the principles of the invention, the SNDR layer is controlled by software running on the lower tier 208 of the inventive data replication system. The lower tier includes a native interface 242 that converts the APIs exported by the SNDR later 254 into a platform-independent language, such as Java™. The native interface 242, in turn, is controlled by an SNDR management facade 240 that provides the required remote management capability.

The SNDR management facade 270 provides a means by which the SNDR layer 254 can be accessed and managed as a Jiro™ service, i.e., a service that can be managed in a distributed environment from a remote host. The SNDR management facade 270 is essentially an object-oriented model of the kernel-resident SNDR layer 254. It provides a collection of APIs to manage the SNDR layer 254.

The SNDR federated bean 232 uses the SNDR management facade 270 to configure, control and examine the status of the SNDR layer 254 and to provide other important functions. SNDR bean 232 also communicates with a data services bean, such as bean 234, whenever bean 232 starts or stops using a volume managed by data services bean 234. In order to manage data volumes, data services bean 234 communicates with a data services layer 252 in the layered stack 250, via a data services management facade 244 and a native interface 246. As with the corresponding SNDR management facade 240 and native interface 242, the data services management facade 244 provides a means by which the data services layer 252 can be accessed and managed as a Jiro™ service. The native interface 246 converts the platform-specific kernel routine API's to platform independent interfaces. The data services layer 252 allows the data services bean 234 to locate, prepare and manage logical volumes for use by the data replication system.

Whenever changes are made in the data replication configuration of host 200, both the SNDR bean 232 and the data services bean 234 can inform a configuration manager bean 230 of the change in configuration information. SNDR bean 232 also retrieves configuration information from configuration manager bean 230 under appropriate situations. Configuration manager bean 230 maintains a persistent view of the configuration of the data replication on host 200. In this manner, if the host is interrupted during a data replication operation, it can be restored to the proper state when the operation is resumed.

Figure 3:
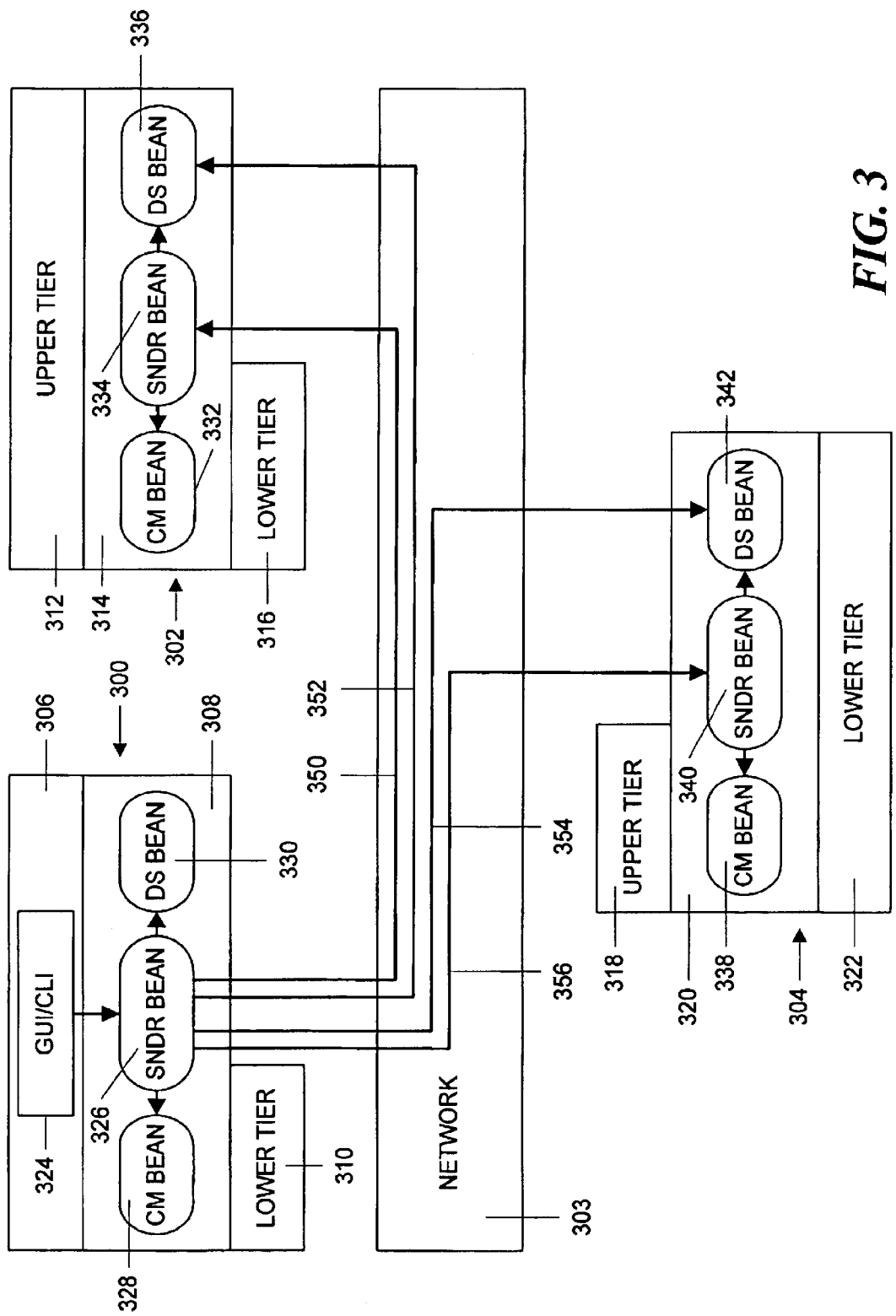
FIG. 3 is a schematic block diagram illustrating how multiple hosts communicate via the federated beans in the middle tier.

By using SNDR federated beans, such as SNDR bean 232, the data replication manager can create and manage the system from any host in the data replication system. In particular, as described below, the beans can communicate via a network connecting the hosts. For example, FIG. 3 illustrates a system with three hosts 300, 302 and 304 connected by a network 303. Although each of hosts 300, 302 and 304 in this figure include the components illustrated in FIG. 2, only the middle tier has been shown in detail in each host 300, 302 and 304 in order to simplify the diagram.

Host 300 has an upper tier 306, a middle tier 308 and a lower tier 310. A GUI/CLI 324 running in the upper tier 306 of host 300 can be used by a manager to create and manage the data replication system. A manager could also manage the system from a similar GUI/CLI running in upper tiers 312 and 318 of hosts 302 and 304, respectively.

GUI/CLI 324 interacts with an SNDR federated bean 326 running in host 300. As discussed with respect to FIG. 2, bean 326 can interact with a configuration manager bean 328 and a data services bean 330 also running in the middle tier 308 of host 300. In a similar manner, an SNDR federated bean 334 is running in the middle tier 314 of host 302. Bean 334 can interact with a configuration manager bean 332 and a data services bean 336 also running in the middle tier 314 of host 302. Another SNDR federated bean 340 is running in the middle tier 320 of host 304. Bean 340 can interact with a configuration manager bean 338 and a data services bean 342 also running in the middle tier 320 of host 304.

Although a manager interacts with the GUI/CLI running in host 300, a data replication system can be created involving volumes located in two or more hosts. In order to provide communication between hosts, the SNDR beans in the various hosts can communicate with SNDR beans and data services beans in other hosts, via the network 303. For example, bean 326 can communicate with the data service bean 330 on its host to ascertain the location of data service beans running on other hosts. Once the location of these data service beans is known, bean 326 can interact with the data services beans running on these other hosts in order to retrieve federated bean proxies of other SNDR beans that are running on the other hosts. The federated bean proxies are identifiers or "handles" that can be used by bean 326 to call appropriate methods in other SNDR beans, whose methods are necessary to perform different operations. For example, bean 326 can contact data service bean 336 on host 302, via network 303, as indicated schematically by arrow 352, in order to receive a federated bean proxy to SNDR bean 334. Using this proxy bean 326 can then communicate directly with bean 334 by calling methods in bean 334 as indicated schematically by arrow 350.

In a similar manner, bean 326 can contact data service bean 342 on host 304, via network 303, as indicated schematically by arrow 354 in order to receive a federated bean proxy to SNDR bean 340. Using this proxy, bean 326 can then communicate directly with bean 340 by calling methods in bean 340 as indicated schematically by arrow 356.

Using federated bean proxies, as appropriate, a manager who controls bean 326 can also control SNDR beans running in other hosts to configure, control and monitor the SNDR data service layers in those hosts, via a management facade and a native interface as previously discussed, in order to locate, prepare and manage volumes in those hosts. This arrangement gives an administrator working with GUI/CLI 324 the capability of remotely managing data replication as opposed to the prior art mechanism of purely primary and secondary host-based management. When an SNDR federated bean encounters an error in a remote operation carried out on a proxy it retrieved earlier, it retrieves the proxy again and retries the operation before throwing an error. This retry capability allows a restart of other services that are necessary for the data replication system to perform its functions.

Figure 4:
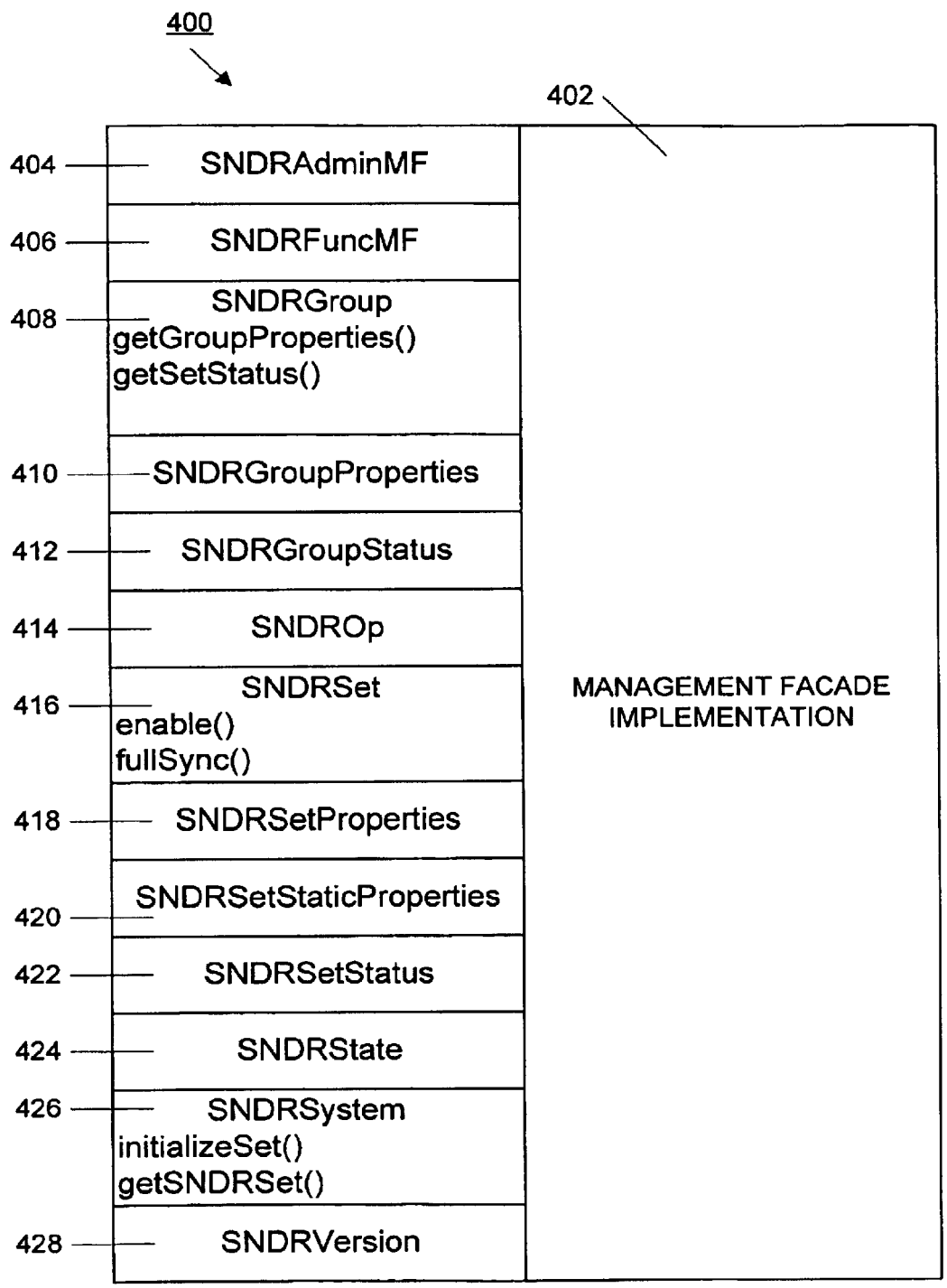
FIG. 4 is a more detailed schematic diagram of the management facade illustrating the interfaces exported by the management facade.

FIG. 4 illustrates, in schematic form, the interfaces 404–428 exported by a SNDR management facade 400. In order to understand the operation of the SNDR management facade 400, the concept of a SNDRSet construct and a SNDRGroup construct need to be introduced. The granularity of remote mirroring as provided by the inventive data replication system is a logical volume. However, the SNDR layer 254 needs a collection of information in order to provide the remote mirroring capability on a logical volume basis. In addition, the data replication system needs additional information in order to easily manage the remote mirroring. This collection of information is encapsulated in the SNDRSet construct and a SNDRGroup construct. As mentioned previously, the host from which data is mirrored is denoted as a primary host, and the host to which data is mirrored is denoted as a secondary host. The term primary and secondary is relative to each individual SNDRSet and SNDRGroup constructs.

A SNDRSet construct is the logical entity that provides remote mirroring capability on a logical volume basis. It contains information which is necessary for a SNDR layer, such as layer 254, to provide remote mirroring, such as: mode of operation (synchronous or asynchronous), primary host name, primary volume name, primary bitmap name, secondary host name, secondary volume name, secondary bitmap name, direct I/O device name (if applicable), group to which the set belongs (if any), and the maximum number of writes as well as 512 byte blocks (FBAs) that can be queued (in case of asynchronous remote mirroring for the set).

Some additional information is also included in the SNDRSet. This information includes: a user provided (unique) name of the SNDRSet, whether to resynchronize automatically after failure, and whether to use a completely "clean" or "dirty" bitmap (whether the volumes are synchronized or not) when remote mirroring is enabled.

A SNDRSet construct is uniquely identifiable by the secondary host name and secondary volume name, since one logical volume in a particular host cannot be used as a mirroring target for more than one logical volume in the data replication system. However, a logical volume can be mirrored to multiple logical volumes in one or more hosts. This is commonly referred as a "one-to-many" configuration in the data replication system. It may be noted that a one-to-many configuration does not correspond to a single SNDRSet construct. Instead, each primary and secondary volume pair constitutes a unique SNDRSet construct. Thus, a one-to-many configuration corresponds to multiple SNDRSet constructs that happen to have the same primary volume remotely mirrored.

Similarly, a volume in a host can be remotely mirrored to a volume in another host, which, in turn, can be remotely mirrored to another volume in a different host. This is referred as a "multi-hop" configuration in the data replication system. As with a one-to-many configuration, a multi-hop configuration also does not correspond to a single SNDRSet construct. Instead, each hop constitutes a unique SNDRSet construct.

Finally, in another configuration called a "campus" data replication, a secondary volume is exported to the primary host. In this case, the primary host has a valid pathname to a volume that coincides with the secondary volume in the secondary host. This situation does correspond to a single SNDRSet construct.

A SNDRSet object embodying the SNDRSet construct is created when the necessary information is provided. This information is required at both the primary and secondary hosts. If any configuration information is changed in one SNDRSet object, the same information must be changed for both the primary and secondary hosts.

Once a SNDRSet construct is created, several operations can be performed on it, if allowed. First, there are operations that may, or may not, be performed simultaneously at both the primary host and secondary host. These operations include enabling the data replication, disabling the data replication, suspending the data replication, resuming a suspended operation and logging operations. There are also operations that can be initiated only from the primary host. These include full forward synchronization, updating forward synchronization, full reverse synchronization and updating reverse synchronization.

A set of reconfiguration operations can also be performed on the SNDRSet. These operations, which have to be performed simultaneously at primary host and the secondary host, include reconfiguring the user-provided set name, reconfiguring the primary bitmap, reconfiguring the secondary bitmap, reconfiguring the group membership, reconfiguring the direct I/O device, reconfiguring automatic resynchronization, reconfiguring the maximum number of writes pending in the queue and reconfiguring the maximum number of FBAs queued.

The operations that are allowed on a particular SNDRSet construct depend on the state of the SNDRSet construct. A SNDRSet construct will be in one of three mutually exclusive states: enabled, disabled and suspended. When the SNDRSET construct is in the enabled state, it must be in one of the following mutually exclusive states: logging writes, replicating writes, forward synchronization in progress, and reverse synchronization in progress.

There are also seven other auxiliary states that a SNDRSet can be in. These include "golden" (no error to report), local volume failed, local bitmap failed, remote network interface failed, direct I/O device failed (in case of campus SNDR), forward synchronization needed and reverse synchronization needed.

When a SNDRSet object is created, it is initialized in the disabled state. However, the user can specify whether a SNDRSet should be enabled at the time of its creation. An enable operation can be performed on a SNDRSet if it is in the disabled state. A disable operation can be performed any time unless the SNDRSet is in a suspended state. The suspend and resume operations are not exposed to the user; instead, they are used by startup and shutdown scripts. A SNDRSet can be suspended if it is not in disabled state, and can be resumed only if it is in suspended state. A logging operation can be applied on the SNDRSet anytime at the primary site. A logging operation can also be applied any time at the secondary site except when a synchronization (forward or backward) is in progress. In addition, reconfigure operations that involve bitmaps cannot be used when a synchronization (forward or backward) is in progress.

These synchronization operations may be complicated if one-to-many and multi-hop configurations are involved. However, if those configurations are not involved, forward synchronization is permitted if the SNDRSet is not in a reverse-synchronization-needed state and the SNDRSet is not part of a one-to-many configuration where some SNDR set is in a synchronization-needed state. Reverse synchronization is disallowed if the SNDRSet is in a forward-synchronization-needed state.

In a one-to-many configuration, reverse synchronization is not allowed if any other SNDRSet that is part of the one-to-many configuration is doing forward or reverse synchronization or replicating writes. In a multi-hop configuration, if a hop is doing reverse synchronization, then the previous hop can not perform forward synchronization. Similarly, if one hop is doing synchronization (forward or reverse) or replicating writes, then the next hop can not perform reverse synchronization. However, the previous hop can perform reverse synchronization if the next hop is replicating or logging writes (and not in the process of synchronizing).

A SNDRGroup is a collection of SNDRSets that have the same group name, the same primary host, the same secondary host and the same mode (synchronous/asynchronous) of operation. Write ordering among various member SNDRSets in a SNDRGroup is maintained by the data replication system. This ordering is very important for database and other applications. A SNDRGroup has similar states to those as of a SNDRSet. When an operation is applied to a SNDRGroup, it is actually applied to all of the member SNDRSets. The operation is carried out on each member SNDRSet irrespective of failure of the operation on one or more member SNDRSet. If the operation fails on one or more SNDRSets, then the group enters into an "unknown" state and the user must take corrective actions manually.

A SNDRGroup can optionally be locked. If a SNDRGroup is locked, all configuration changes, such as SNDRSet additions or deletions, are prevented and only SNDRGroup operations (as opposed to individual SNDRSet operations) are allowed on the member SNDRSets. A SNDRGroup can only be deleted if it has no member SNDRSets.

The management facade 400 comprises the exported interfaces 404–428 and the implementation 402 that are discussed below. Facade 400 has a Jiro administrative interface that is defined by the SNDRAdminMF interface 404. Interface 404 provides APIs to do tracing, logging and polling for SNDR related activities. Facade 400 also has a functional interface defined by the SNDRFuncMF interface 406 that provides APIs to allow access to the SNDRSystem interface 426. The SNDRSystem interface 426 provides APIs to create and delete SNDRSets that are represented by the SNDRSet interface 416. If necessary, SNDRSets can be put together under a SNDRGroup represented by interface 408. Interface 426 also provides APIs to create and delete SNDRGroups and to obtain various SNDR specific information. These APIs include the initializeSet( ) method. In this method, the task of set initialization is delegated to an initialize( ) method of an SNDRManagerImpl module or subprogram that implements the SNDRSystem interface. When the after method is called, it performs several error checks. For example, the method checks the validity of the user-provided data. It also checks whether the resulting SNDR set will violate any constraints, etc. If all the checks are passed, then a new SNDRSet object is added to the list of the SNDR sets managed by the SNDRManagerImpl module. The SNDRSystem API also includes a getSNDRSet( ) method that returns a handle to an appropriate SNDRSet.

The SNDRGroup interface 408 provides APIs to add or remove a SNDRSet from the SNDRGroup, to lock or unlock a group, to modify group adjustable parameters, to apply operations like enable or disable, log, synchronize, etc. to the group as a whole. An instance of the SNDRGroupProperties interface 410 is created by the SNDRGroup method getGroupProperties( ). Similarly, an instance of the SNDRGroupStatus interface is created by the SNDRGroup method getSetStatus( ).

The SNDROp interface 414 defines the various operations that can be performed on a SNDRSet or SNDRGroup.

The SNDRSet interface 416 provides APIs to perform set-specific operations, such as enabling or disabling a SNDRSet, suspending or resuming a SNDRSet, logging and synchronizing a SNDRSet, etc. The API includes an enable( ) method that creates a set of objects in native interface (242 in FIG. 2) in order to communicate with the kernel routines. These native objects are populated with appropriate SNDR set information and SNDR data replication layer 254 is requested to enable an SNDR set with the information passed through the objects. The SNDR data replication layer 254 then enables the set by updating/creating new internal kernel data structures.

Interface 416 also includes a fullSync( ) method, which, when called, sets up necessary native interface objects for communication with the SNDR data replication layer in the kernel. The SNDR data replication layer is then requested to synchronize the primary and secondary volumes through these native interface objects and method calls. Once the synchronization is complete, the SNDR set goes into a replicating mode.

Interface 416 also has APIs to reconfigure SNDRSet properties, such as name, group to which the set belongs and other various adjustable properties. An instance of the SNDRSetProperties interface 418 is created by the SNDRSet method getSetProperties( ). The SNDRSetStaticProperties interface 420 defines the SNDRSet parameters that cannot be changed for the lifetime of the SNDRSet. Similarly, an instance of the SNDRSetStatus interface 422 is created by the SNDRSet method getSNDRSetStatus( ).

The SNDRState interface 424 defines various states that a SNDRSet or SNDRGroup can be in. Finally, the SNDRVersion 428 defines the version of the data replication system.

Figure 5:
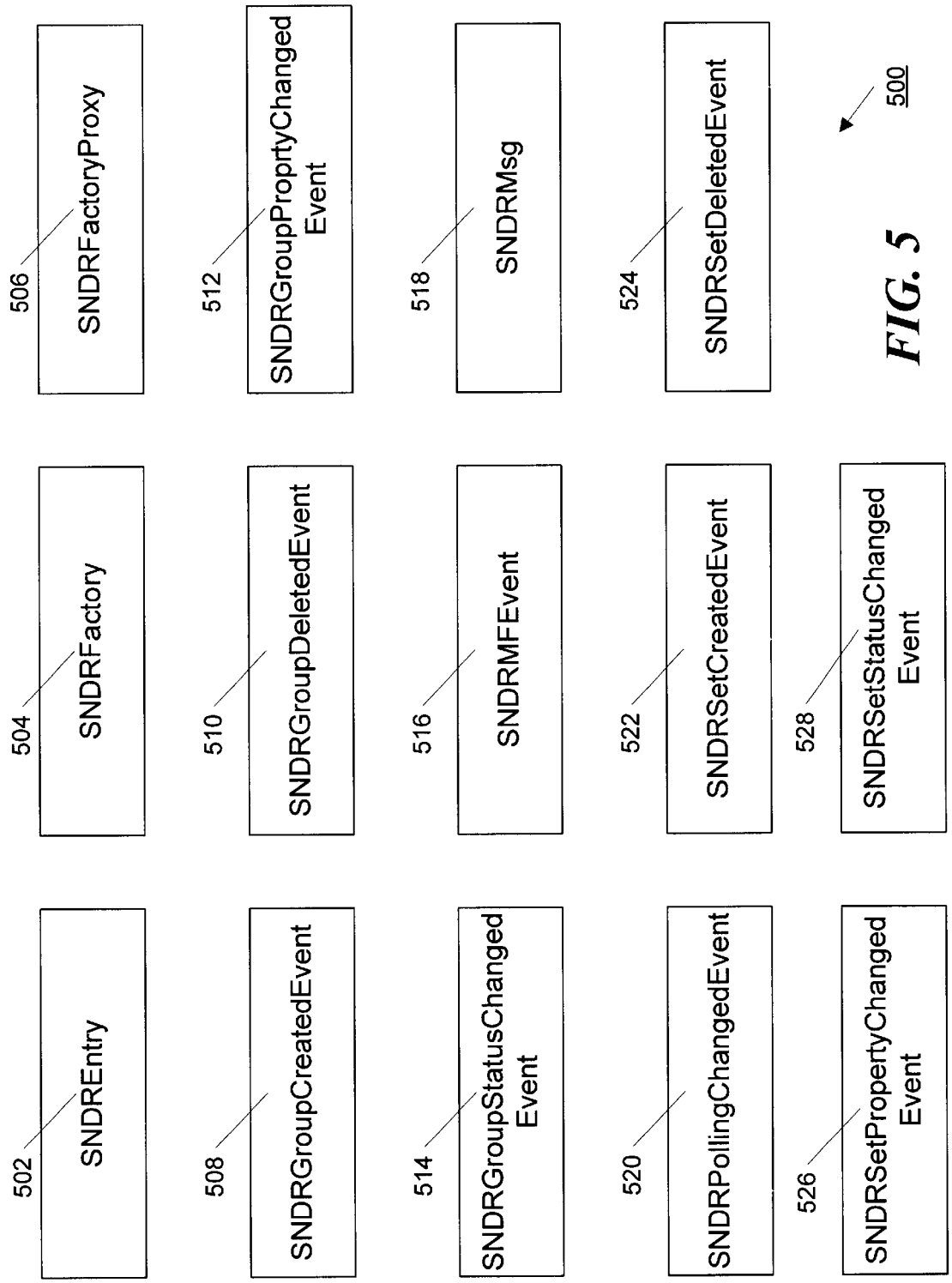
FIG. 5 is a schematic diagram illustrating the classes used to implement the management facade.

The SNDR management facade 400 automatically detects changes in the kernel information in the SNDR layer 254 via polling and fires various events using the Jiro™ event service when monitored changes occur. These events create an instance of an event object. A set of classes is used to construct the management facade implementation 402 shown in schematic form in FIG. 5. These classes include the SNDREntry class 502 that encapsulates lookup entries specific to the data replication system. Also included are the SNDRFactory class 504 and the SNDRFactoryProxy class 506. These latter classes provide life cycle services for the SNDR management facades. The SNDRMsg class provides an anchor point for SNDR service logging and tracing.

Management facade 400 logs errors using the log service provided by the Jiro™ framework. It also fires events when interesting changes occur in SNDR system. A number of classes are used to encapsulate these events. These classes include the SNDRMFEvent class 516, which is an abstract event class that acts as a root for all SNDR management facade events.

The SNDRGroupCreatedEvent 508 creates an event object that is posted whenever a new SNDRGroup is created and the SNDRGroupDeletedEvent 510 creates an object that is posted whenever an SNDRGroup is deleted. The SNDRGroupPropertyChangedEvent 512 and the SNDRGroupStatusChangedEvent 514 are crated and posted when one or more SNDRGroupProperties have changed or when the SNDRGroupStatus has changed for an SNDRGroup.

Similarly, the SNDRSetCreatedEvent 522 creates an object that is posted whenever a new SNDRSet is created and the SNDRSetDeletedEvent 524 creates an object that is posted whenever an SNDRSet is deleted. The SNDRSetPropertyChangedEvent 526 and the SNDRSetStatusChangedEvent 528 are created and posted when one or more SNDRSetProperties have changed or when the SNDRSetStatus has changed for an SNDRSet.

The Jiro™ framework scheduling service is also used to start and stop polling as well as for changing the polling interval as needed. The SNDRPollingChangedEvent 520 is posted whenever management facade polling is started or stopped or the polling interval is changed.

Figure 6:
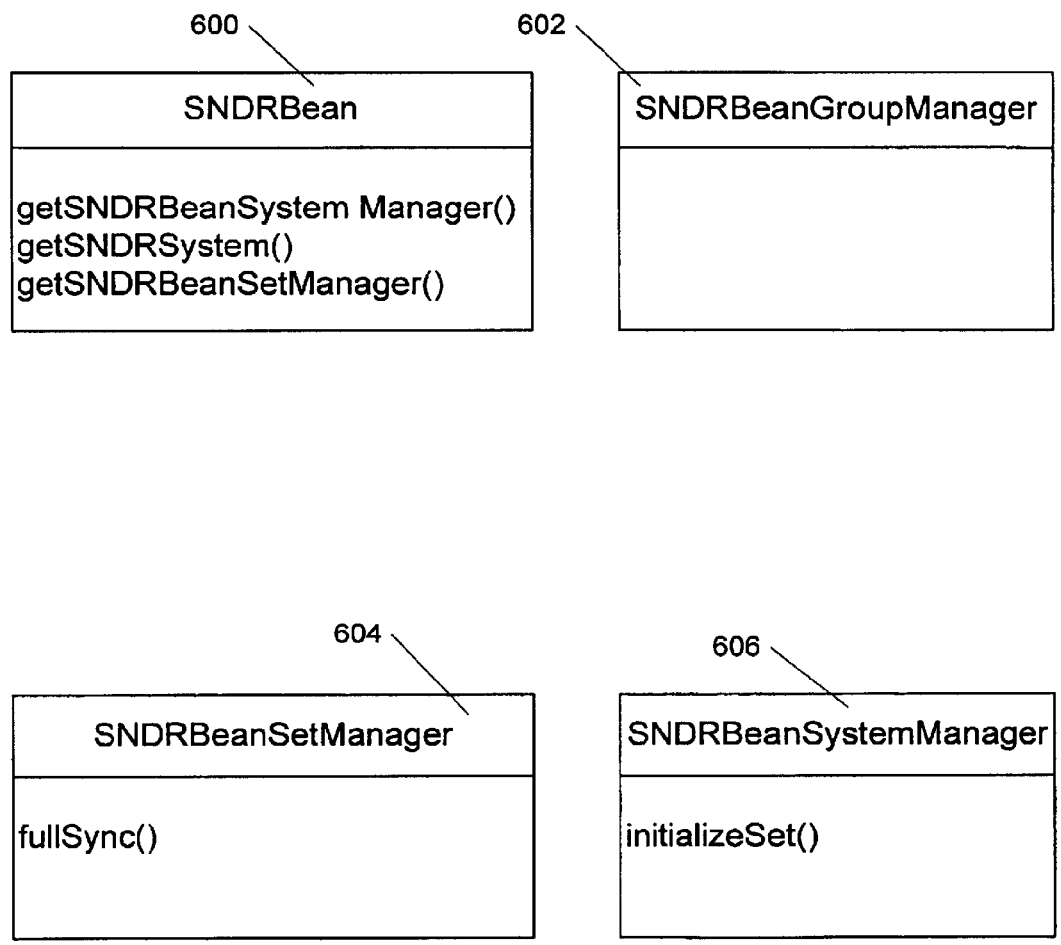
FIG. 6 is a schematic diagram of the interfaces exported by an SNDR federated bean.

The interfaces exported by the SNDR federated bean are illustrated in FIG. 6. These include the SNDRBean interface 600 that defines the SNDR federated bean and the SNDRBeanGroupManager 602 that provides a representation of an SNDR group. Also included are the SNDRBeanSetManager 604 that provides a representation of an SNDR set and the SNDRBeanSystemManager 606 that defines the system interface for an SNDR bean.

The SNDRBean interface 600 includes has number of methods that are used to manage the system. These methods include the getSNDRBeanSystemManager( ) method that retrieves a handle to a SNDRBeanSystemManager object that manages the overall SNDRSystem and provides APIs to create SNDR sets. The getSNDRSystem( ) method can be used to contact the SNDR management facade (240, FIG. 2) in order to retrieve an SNDRSystem object that the management facade is using as the manager of individual SNDR sets and groups.

A getSNDRBeanSetManager( ) method can be called to retrieve an SNDRBeanSetManager object which manages operations pertaining to individual SNDR sets. The interface 604 of the SNDRBeanSetManager object includes a fullSync( ) method which, as described below can be used to synchronize volumes in the appropriate SNDRSet.

An SNDR federated bean may be controlled by either a graphic user interface or a command line interface. FIGS. 7–11 are screen shots illustrating screen displays that comprise an illustrative GUI used to control the federated bean. FIG. 7 illustrates the main screen of the SNDR GUI. When a user selects an SNDR option in a management console used to control the data replication system, the GUI displays the window 700. Window 700 displays all currently configured SNDR sets and groups. In particular it displays a single line, such as lines 702 and 704 for each configured SNDR set and a single line, such as line 706 for each configured SNDR group. For each line the display 700 shows the name of SNDR set/group in column 708, the type (created on the primary host or created on the secondary host) in column 710, the state of the SNDR set/group (replicating, logging, etc.) in column 712, and the operational status of the SNDR set/group (NORMAL, DEGRADED, ERROR etc.) in column 714.

Figure 8:
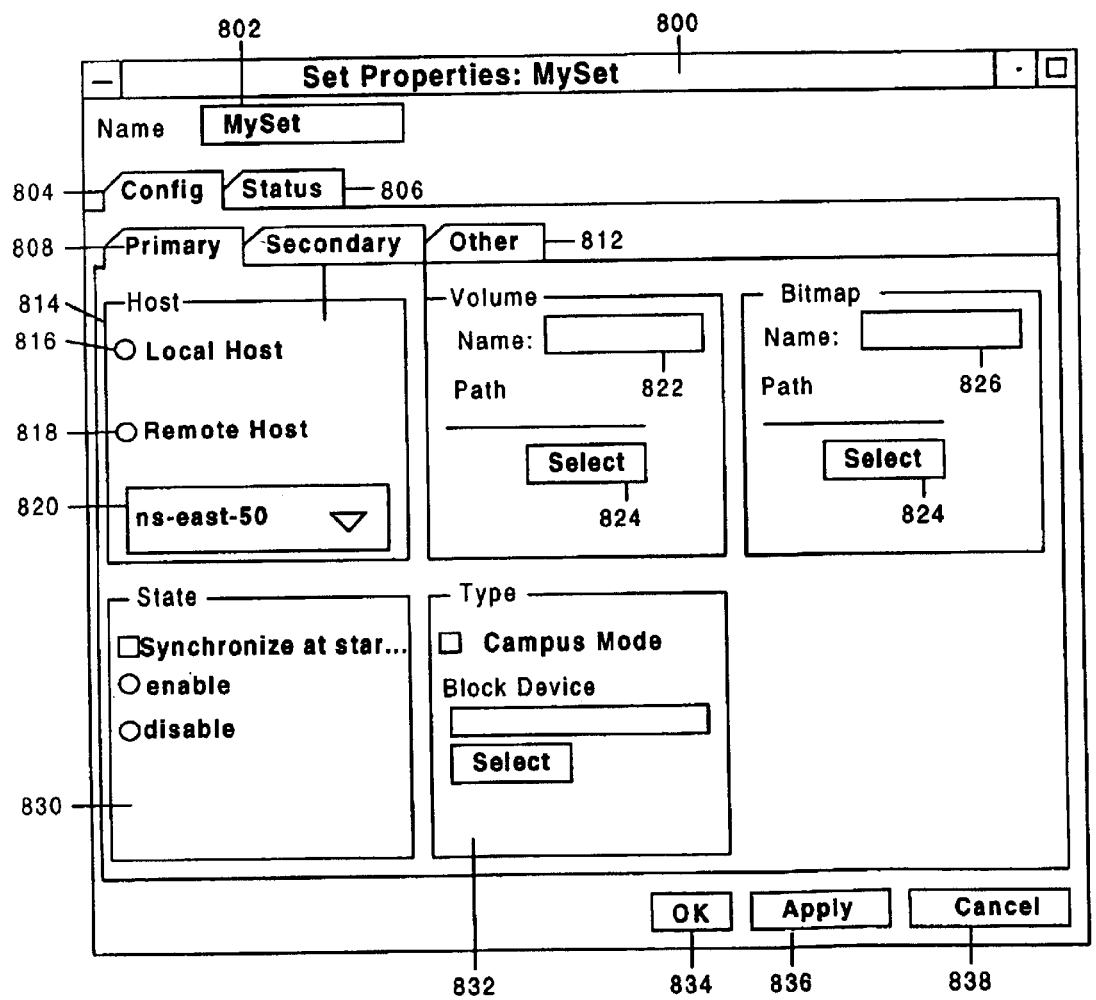
FIG. 8 is a screen shot of a screen generated by a management GUI that displays the configuration and present status of a set or group that has been selected in the display of FIG. 7.

When one of the lines 702–706 is selected, for example, by double-clicking on the line, the configuration of the selected set or group are displayed with a screen display 800 such as that shown in FIG. 8 which illustrates the display when a line corresponding to a set is selected. This screen can also be used to configure a SNDR set. The screen 800 displays the name 802 of the selected set and has a configuration tab 804 and a status tab 806. The configuration tab 804 is selected in FIG. 8. On the page corresponding to tab 804 there are three additional tabs: primary 808, secondary 810 and other 812. FIG. 8 illustrates the screen display with the primary tab 808 selected and depicts the primary side information that a user must enter in order to configure the SNDR set. This information includes whether the primary host is local or remote, which is selected by option buttons 816 and 818. The primary host name is selected from list 820. The primary volume name is entered into text box 822 and, the path to the primary volume is specified using selection button 824. The primary bitmap volume name and path are also entered and selected using text box 826 and selection button 828. Next, the manager can make a selection in section 830 whether the volumes will be synchronized at the start or not and whether the set will be enabled or disabled. Finally the manager can select in section 832 the network used for data transport: either IP or SCSI over Fibre Channel (campus mode or not) and the name of the block device. The information can be approved by selecting button 834, applied by selecting button 836 or any changes cancelled by selecting button 838.

The secondary side information is displayed by selecting the secondary tab 810 and is similar to the primary side information. This information includes the secondary host name, the secondary volume name and the secondary bitmap name and is displayed in a manner similar to that shown in FIG. 8.

Figure 9:
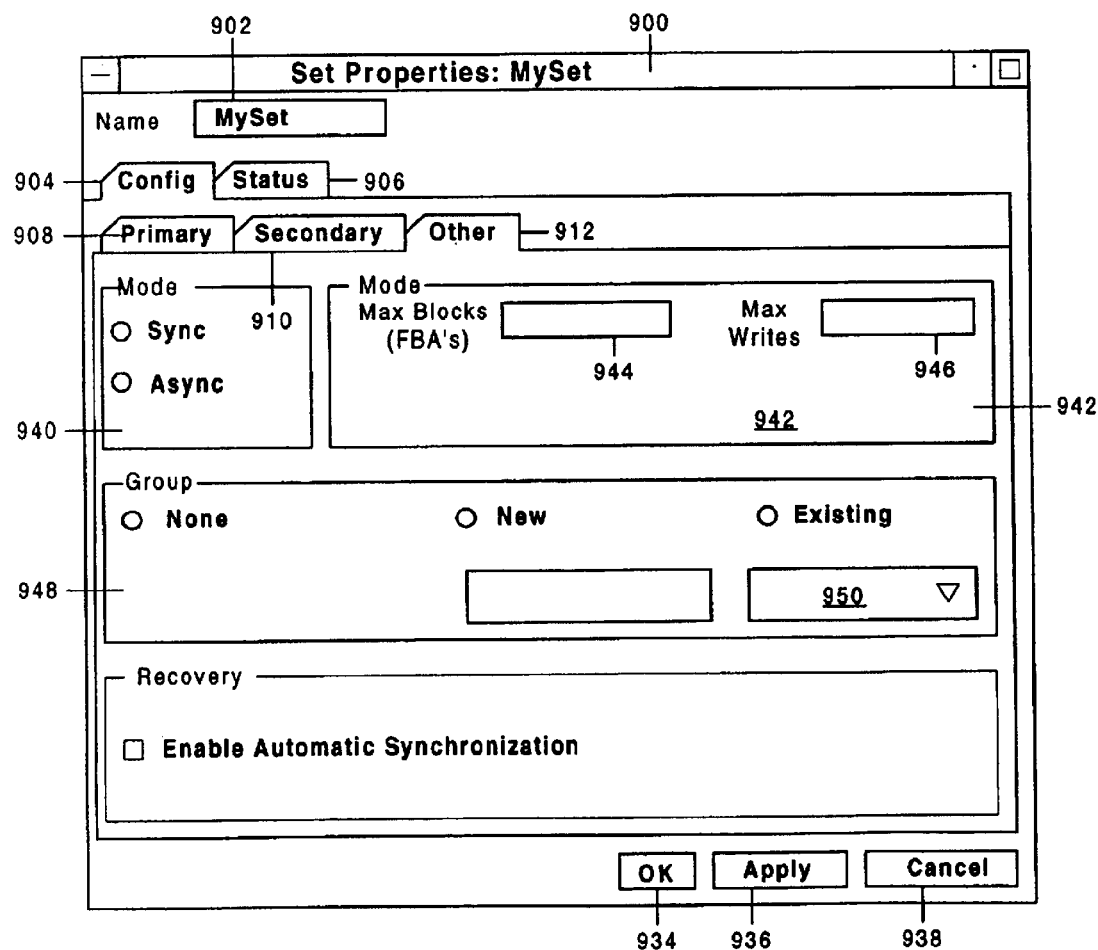
FIG. 9 is a screen shot of a screen generated by a management GUI that allows a user to enter other information that is required to configure an SNDR set.

When the other information tab 812 in FIG. 8 is selected, the GUI displays a screen similar to that shown in FIG. 9. Elements in FIG. 9 that correspond to elements in FIG. 8 have been given corresponding numeral designations and the description of those elements in FIG. 8 applies to the corresponding elements in FIG. 9. The screen 900 shown in FIG. 9 depicts other information that is required to configure a SNDR set. This information includes whether the operation is in synchronous or asynchronous mode as selected by option buttons in section 940, the maximum number of 512 byte blocks and maximum number of writers that can be queued in asynchronous mode which are determined by entering information in text boxes 944 and 946, respectively in section 942, to which group the sets should belong as determined by selecting an appropriate option button in section 948 and selecting the group name from list 950 if the "Existing" option button is selected.

Additional information includes whether the synchronization should occur automatically upon recovery from a failure in the remote side determined by selecting the checkbox in section 950.

Figure 10:
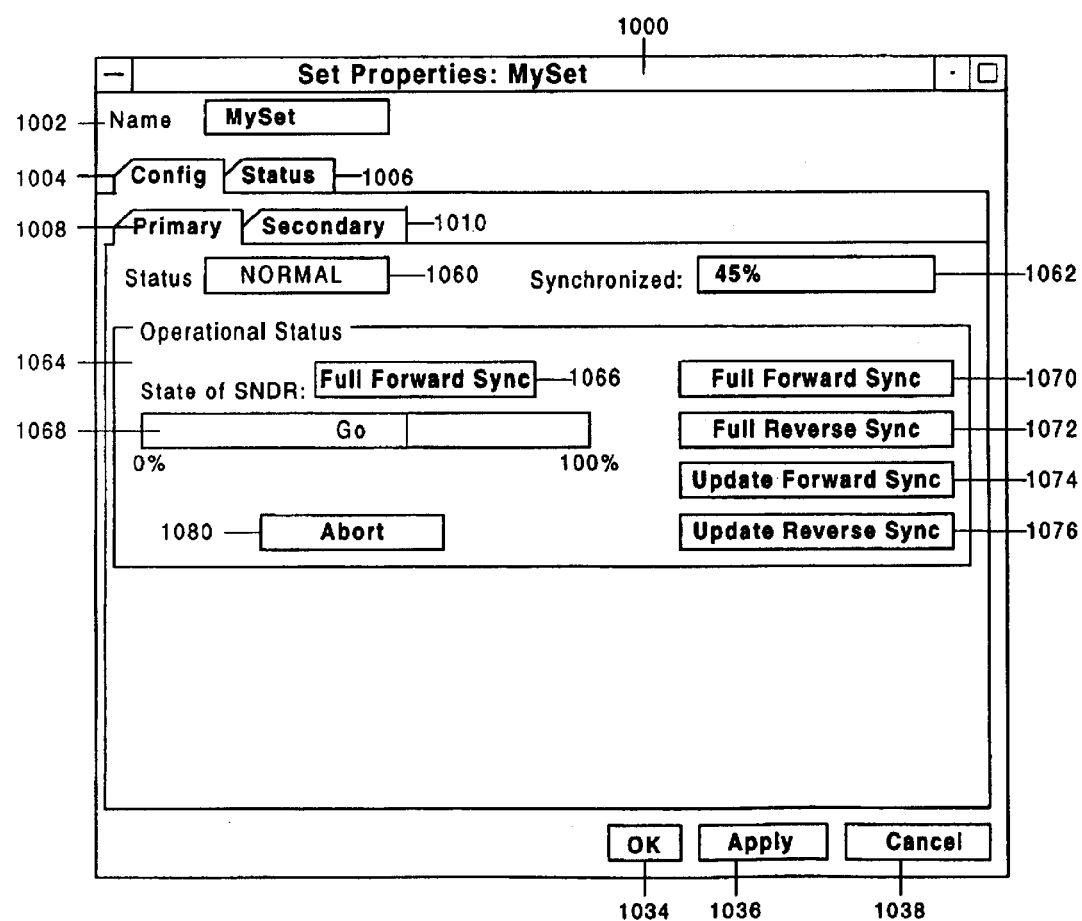
FIG. 10 is a screen shot of a screen generated by a management GUI that depicts the detailed status of the selected SNDR set.

FIG. 10 depicts a status screen for an SNDR set that is displayed when the status tab 1006 is selected. As with FIGS. 8 and 9, elements in FIG. 10 that correspond to elements in FIGS. 8 and 9 have been given corresponding numeral designations and the description of those elements in FIG. 8 applies to the corresponding elements in FIG. 10. FIG. 10 shows the status of the set in display box 1060 and the percentage synchronization with the remote volume in display box 1062.

Operations that can be performed on an SNDR set are also listed on various command buttons: full forward synchronization initiated by selecting button 1070, full reverse synchronization initiated by selecting button 1072, update forward synchronization initiated by selecting box 1074 and update reverse synchronization initiated by selecting box 1076. The present operation being performed on the SNDR set is shown in display box 1066 along with along with percentage completion of the operation shown in completion bar 1068. The operation under way can be cancelled by selecting the "Abort" button 1080.

Figure 11:
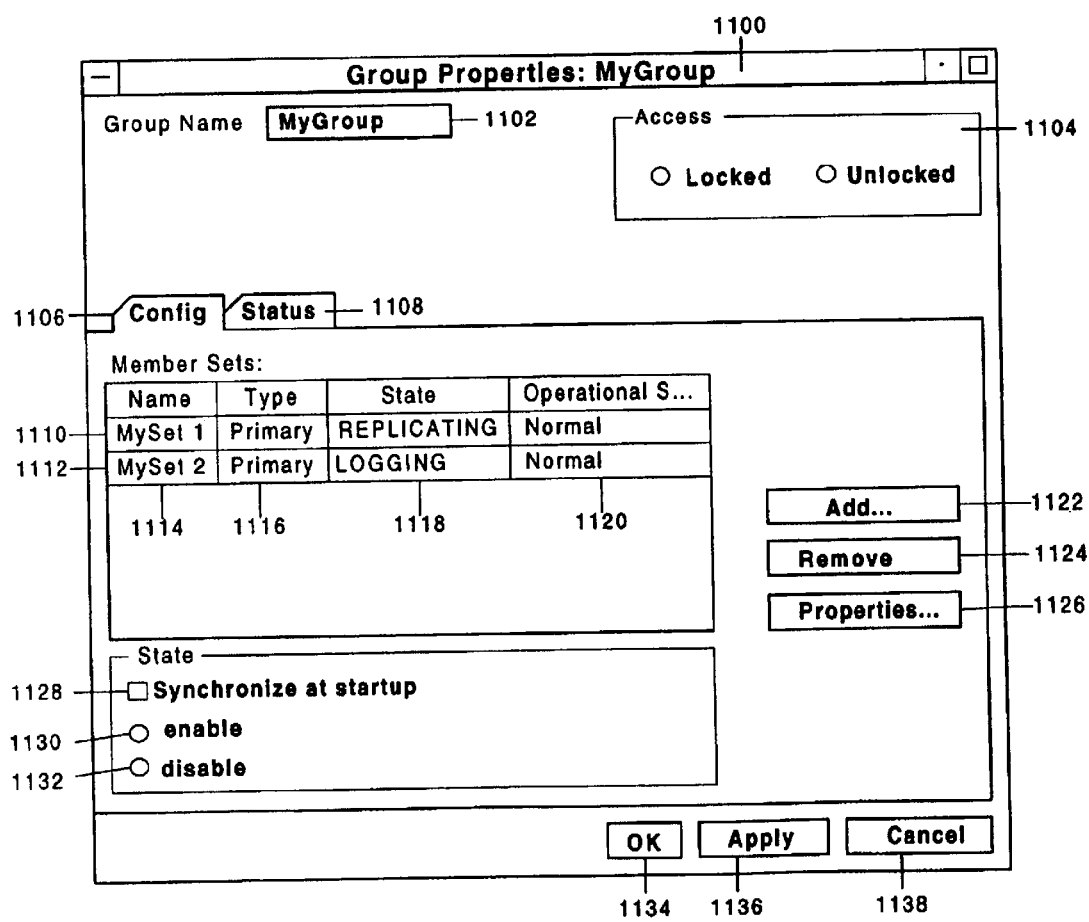
FIG. 11 is a screen shot of a screen generated by a management GUI that displays the configuration of an SNDR group selected in the screen display of FIG. 7.

FIG. 11 illustrates a screen display generated by the GUI when an SNDR group is selected in FIG. 7. This screen is also used to configure a new SNDR group. FIG. 11 depicts the configuration screen 1100 for a SNDR group that is displayed when the "Config" tab 1106 is selected. A group name can be provided for the group by entering the name in text box 1102. Whether the group will be locked or unlocked upon creation is determined by selecting the appropriate option button in section 1104. The set of SNDR sets that will be part of the SNDR group are entered in separate lines, such as lines 1110 and 1112. A new set is entered by selecting command button 1122 and entering the name in column 1114. The type, state and operational status are then displayed in columns 1116–1120, respectively. Similarly, a set can be removed by selecting the line representing it and then selecting the "Remove" command button 1124. A properties button 1126 can be selected to display properties of the selected set.

In addition, the initial state of the group can be set from screen 1100. For example, whether synchronization should occur automatically upon startup is determined by selecting the checkbox 1128. The group can be enabled or disabled by selecting option buttons 1130 or 1132, respectively.

Figure 12:
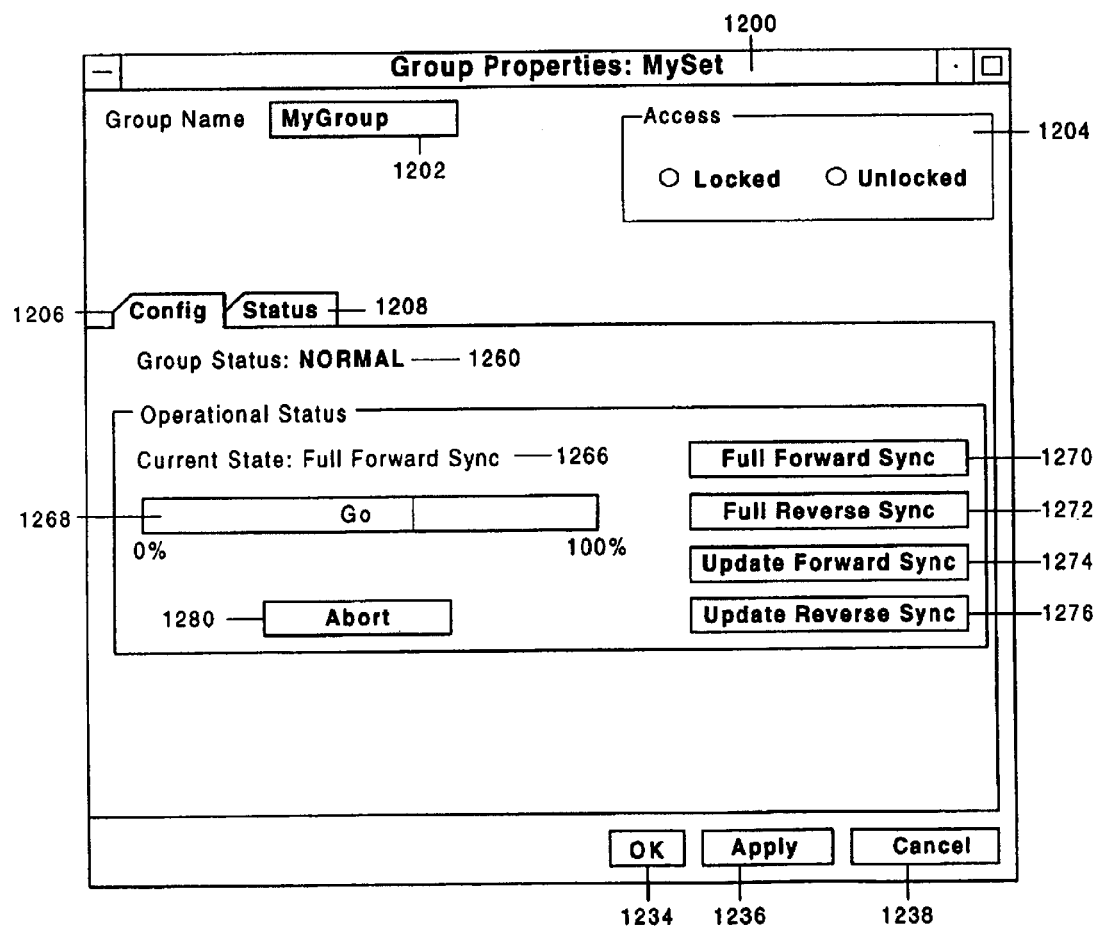
FIG. 12 is a screen shot of a screen generated by a management GUI that depicts the detailed status of the selected SNDR group.

FIG. 12 depicts the status screen 1200 for a SNDR group that is displayed by the GUI when the status tab 1208 is selected. As with FIGS. 10 and 11, elements in FIG. 12 that correspond to elements in FIGS. 10 and 11 have been given corresponding numeral designations and the description of those elements in FIGS. 10 and 11 applies to the corresponding elements in FIG. 12. A group name can be provided for the group by entering the name in text box 1202. Whether the group will be locked or unlocked upon creation is determined by selecting the appropriate option button in section 1204. FIG. 12 also shows the status of the group in display box 1260.

Operations that can be performed on an SNDR group are also listed on various command buttons: full forward synchronization initiated by selecting button 1270, full reverse synchronization initiated by selecting button 1272, update forward synchronization initiated by selecting box 1274 and update reverse synchronization initiated by selecting box 1276. The present operation being performed on the SNDR group is shown in display box 1266 along with along with percentage completion of the operation shown in completion bar 1268. The operation under way can be cancelled by selecting the "Abort" button 1280.

After the information has been entered into the various screens generated by the SNDR GUI, an appropriate command is synthesized and generated when a command button is selected. The results of this command are discussed in connection with FIGS. 13, 14 and 15A–15D, below.

Alternatively, an SNDR federated bean can also be controlled by a command line interface. The basic command is sndradm. Various parameters and variables are used with this command to generate the appropriate information that can be used by the SNDR bean to perform the desired operation. Table 1 lists the various operations that can be specified with the command line interface.

TABLE 1

SNDR Command Parameters

| SNDR Operation | Command | Description |
| --- | --- | --- |
| Create a volume set | sndradm -C | Creates an SNDR volume set; the software creates a default name for the set which can be changed using sndradm -R n. |
| Delete a volume set | sndradm -D | The sndradm -D command enables the deletion of a volume set. It also deletes the volume set from any I/O group to which it belongs. |
| Create a group of SNDR volume Sets | sndradm -C -g | Set the name of the I/O group to contain the collection of SNDR sets and specify the sets. |
| Delete an I/O group | sndradm -D -g | Enables the deletion of an I/O group. |
| Show SNDR volume set and I/O group names | sndradm -L -g | Displays a list of configured SNDR volumes, sets, and I/O groups. |
| Add a volume set to an I/O group | sndradm -A -g | Enables the addition a volume set or collection of sets to an I/O group already created. |
| Removes a volume set from an I/O group | sndradm -m -g | Enables the removal of a volume set from its I/O group. A volume set can be removed if the I/O group is unlocked. |
| Update an I/O group | sndradm -R g | Enables the updating of an existing I/O group after a volume set has been added or removed. |
| Lock or unlock an I/O group | sndradm -R | Enables the locking or unlocking of an existing I/O group. |
| Change a volume set name | sndradm -R n | Change the default name of the SNDR volume set created by the sndradm -C command. |
| Enable the SNDR software for the specified set | sndradm -e | Enables SNDR for the volume set, determines if scoreboard logging is necessary, and enables scoreboard logging if it is necessary. |
| Disable the SNDR Software for the | sndradm -d {p\|s} | Terminates all SNDR replication services between the specified primary and secondary volumes and discontinues the SNDR relationship between these volume sets. Note: The secondary cannot be disabled if the primary is running. |
| Copy the entire contents of the specified volume to another volume; also know as full synchronization | sndradm -c {p\|s} | Starts copying the current primary volume contents to the secondary volume. It also enables concurrent SNDR replication between the primary and secondary volumes. |
| Update only the changed data of the specified volume to another volume; also know as synchronization | sndradm -u | Starts copying only the updated contents of the specified volume to another volume. It also enables concurrent SNDR replication between the primary and secondary volumes. |
| Wait for a synchronization operation to complete | sndradm -w | Enables the SNDR software to be placed in a wait state until an in-progress copy or update synchronization operation completes. |
| Log SNDR Scoreboards | sndradm -l [p] [s] | Start status and scoreboard logging for the specified SNDR sets. The command enables logging operations to be continued whenever SNDR is disabled or interrupted. |
| Change the scoreboard bitmap of a volume set | sndradm -R b | Assign a new scoreboard bitmap to an existing SNDR volume set. |
| Show SNDR status | sndradm -p | Displays brief or detailed SNDR status for volume sets and I/O groups. |
| Toggle the autosynchronization state | sndradm -R a | Enables or disables SNDR auto-synchroization. If SNDR auto-synchronization is enabled on both the primary and the secondary hosts, the SNDR synchronization daemon attempts to resynchronize if the system reboots or link failures occur. |
| Set the asynchronous queue | sndradm -R w sndradm -R f | Set the number of write operations or blocks on the asynchronous queue. |
| See SNDR command Syntax and version | sndradm -h | Displays brief syntax usage. |
| Information from the command prompt | sndradm -v | Displays the software version. |

The command and accompanying parameters are first separated by a conventional parser. The parsed command and parameters are then provided to an interpreter which generates the appropriate objects to represent the SNDR sets and groups and call the API routines exported by the SNDR bean to set up the data replication system.

Figure 13:
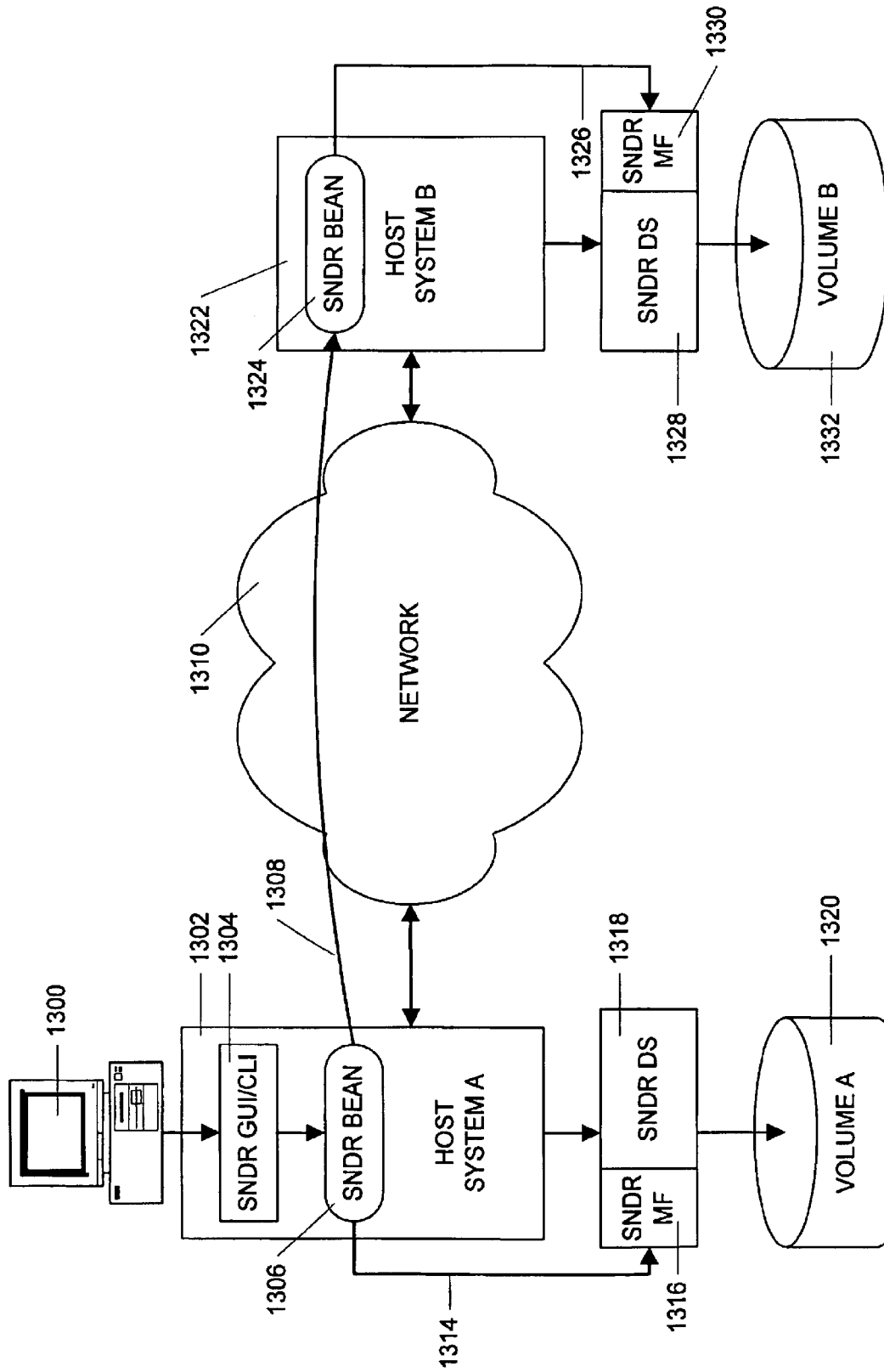
FIG. 13 is a schematic block diagram illustrating the implementation of a simple data replication system using the principles of the present invention.
Figure 14:
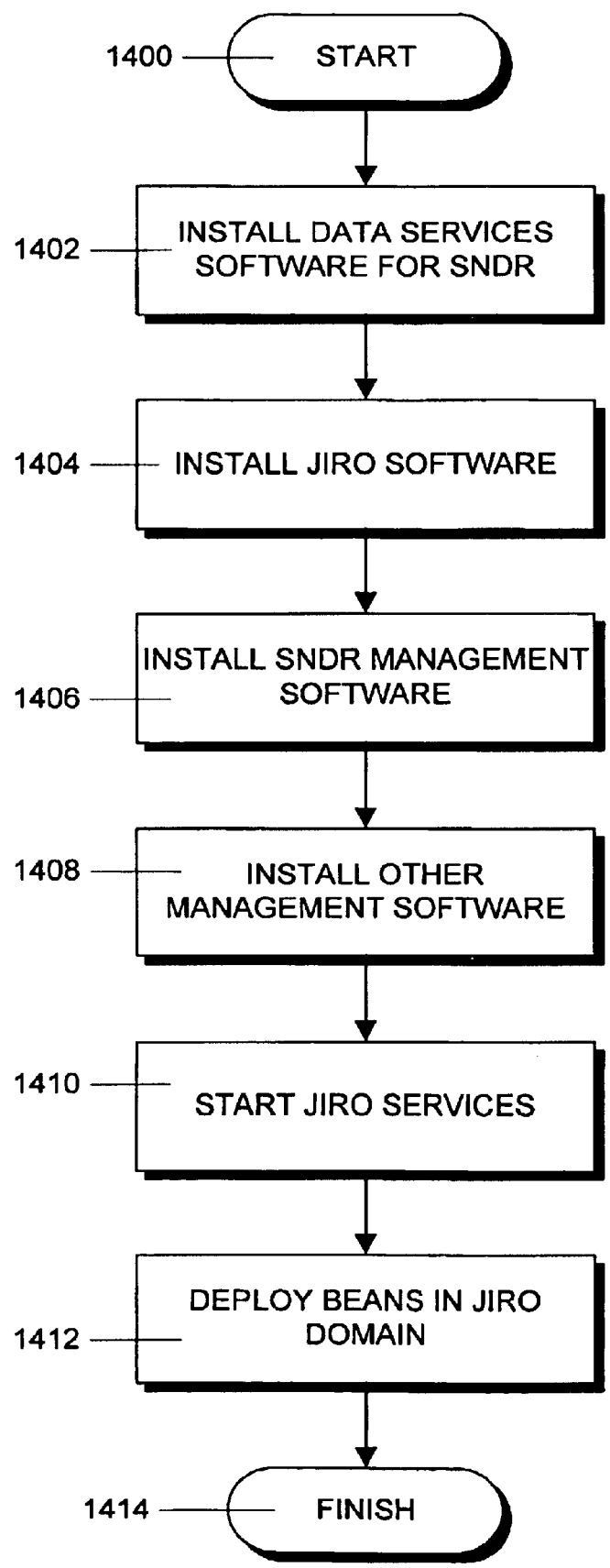
FIG. 14 is a flowchart showing the steps of an illustrative process for installing data replication software in the system of FIG. 13.
Figure 15A:
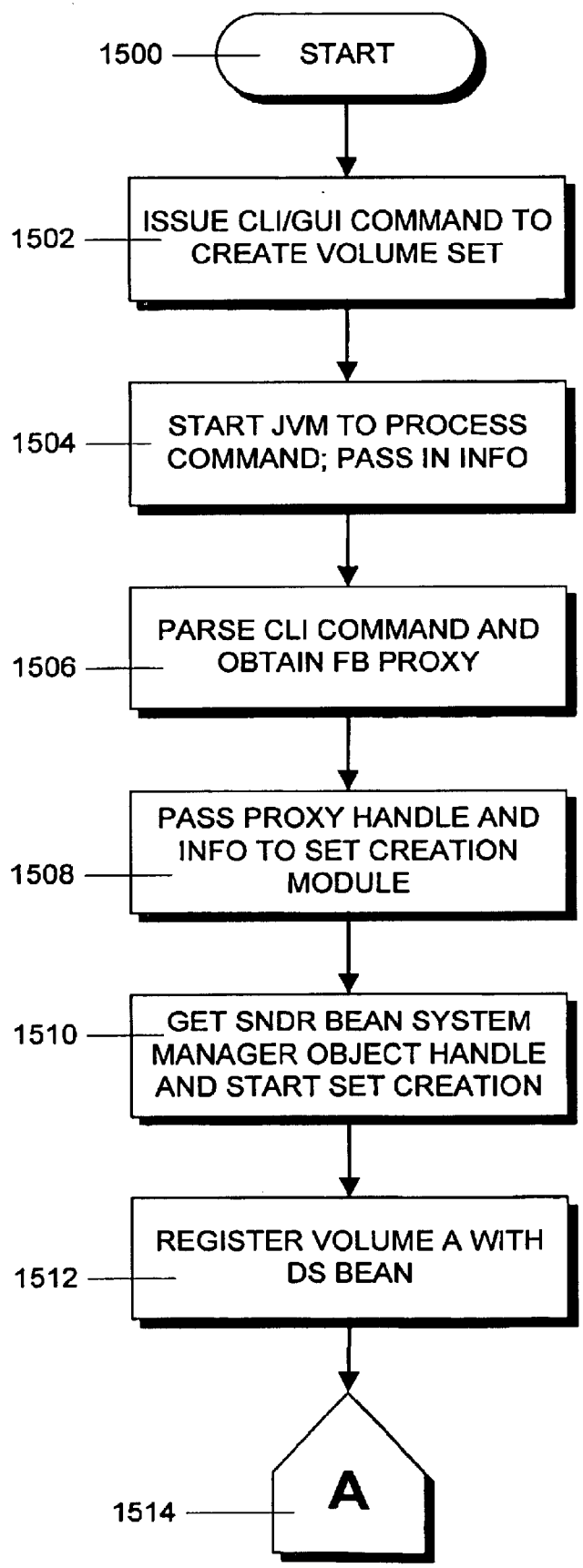
FIGS. 15A–15D, when placed together, form a flowchart showing the steps of an illustrative process for configuring the data replication system of FIG. 13.
Figure 15B:
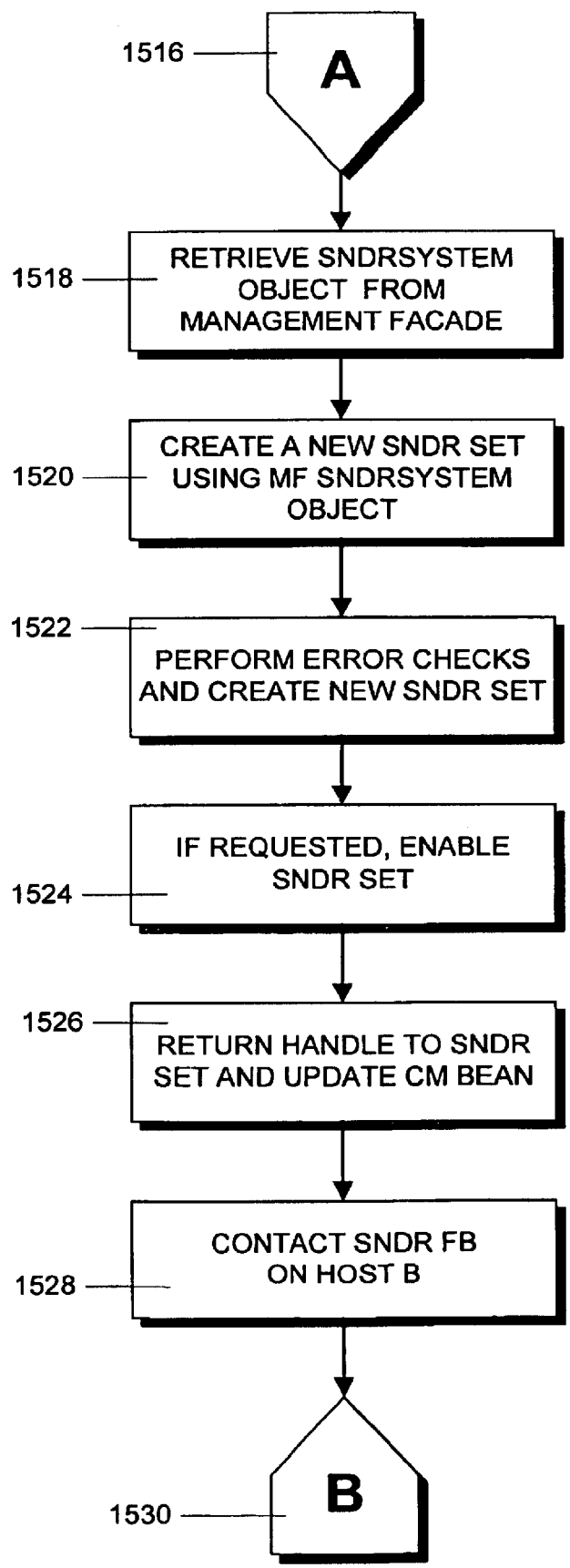
Figure 15C:
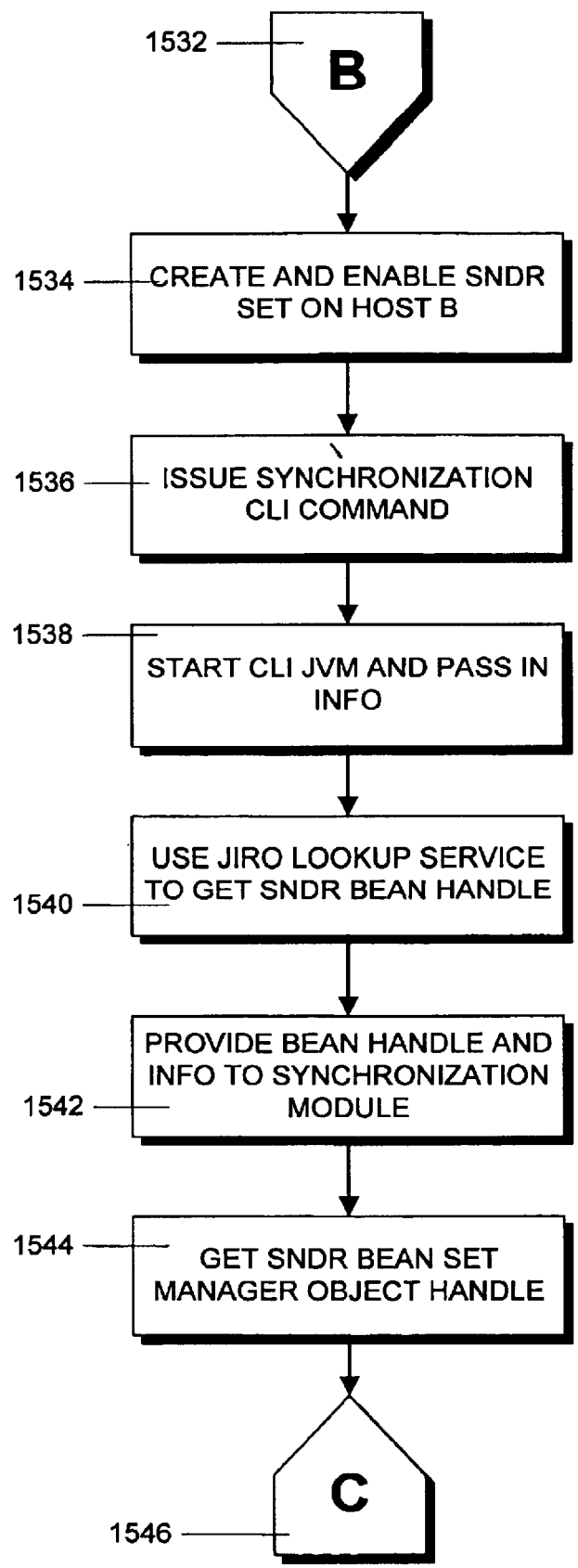
Figure 15D:
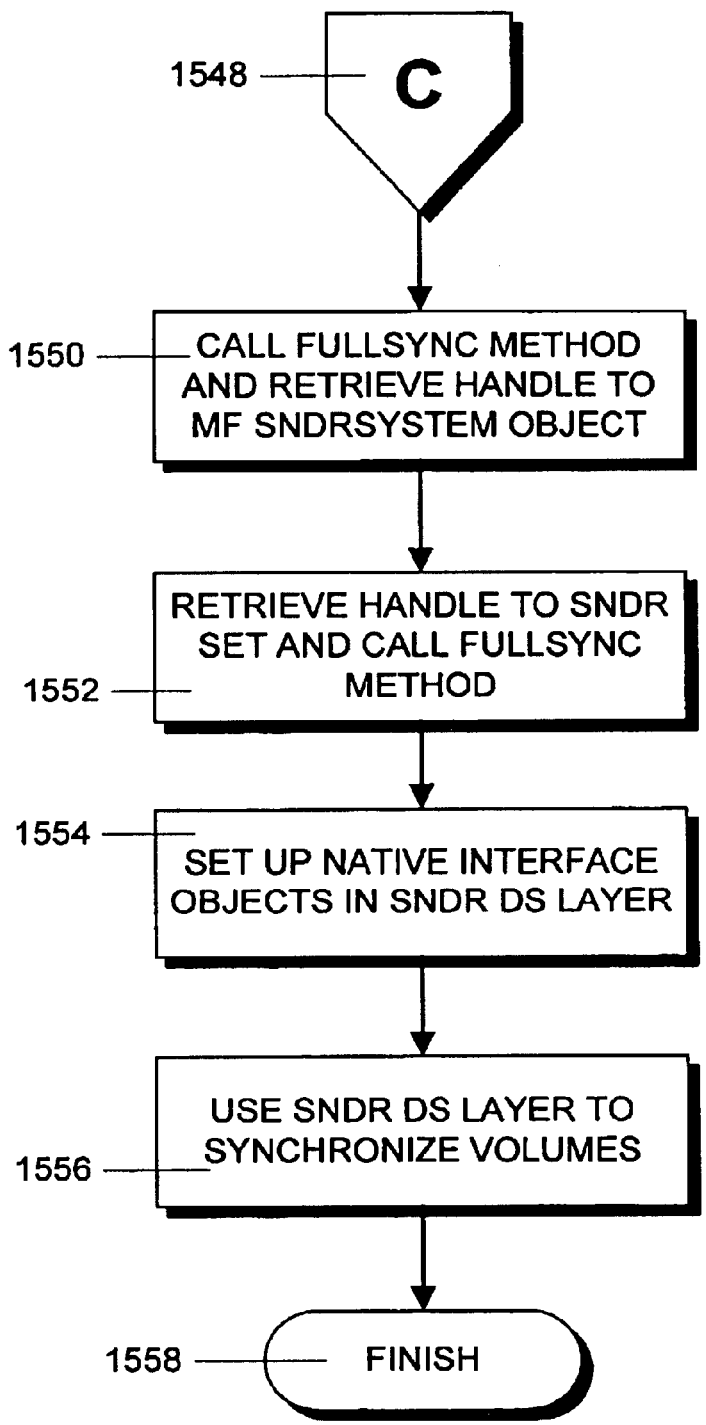

An example data replication setup is illustrated in FIG. 13. FIG. 14 illustrates the steps performed in initially configuring the system. FIGS. 15A–15D show a flowchart illustrating the steps carried out by the inventive data replication system to set up the configuration shown in FIG. 13 and to remotely replicate data from volume A (1320) of host system A (1302) located in geographic region I to volume B (1332) of host system B (1322) located in a different geographic region II using the inventive SNDR management services software, via network 1310.

In order to use the inventive system, the software that is required must first be installed in the system. The steps of the installation process on one host (for example, host system A in geographic region I) are shown in FIG. 14. The installation process begins in step 1400 and proceeds to step 1402 where the data services software used for SNDR is installed on host system A 1302. This software includes the data service layer software 252 and the network data replicator layer 254. Other layers, such as the cache layer can also be included in this installation process.

Next in step 1404, the Jiro™ software is installed. The installation process for this software is explained in detail in the aforementioned Jiro SDK.

In step 1406, the SNDR management software is installed. This software includes the SNDR management facade 240 and the native interface 242. It also includes the SNDR federated bean 232 and the command line interface 222 or graphic user interface 220, as appropriate.

In step 1408, other necessary management services software is installed. This software includes other management facades, such as the data services management facade 244 and its accompanying native interface 246 and federated beans such as the configuration manager bean 230 and the data services bean 234.

Then, in step 1410, the Jiro services software is started with the Jiro domain name jiro:Host_a. In step 1412, the SNDR and other federated beans are deployed in the Jiro domain. During this step, necessary management facades get automatically instantiated. The process then finishes in step 1414.

A process equivalent to that shown in FIG. 14 is also carried out on host B 1322 in geographic region II, except that the Jiro domain name will be jiro:Host_b for host B.

After the installation and deployment steps are complete in both host A 1302 and host B 1322, the process of configuring the system can begin. The steps involved in this process are illustrated in FIGS. 15A–15D. During this process, the system manager executes two CLI commands, or equivalently, uses the SNDR GUI to generate the two commands. The first command creates and enables an SNDR set in both host A 1302 and host B 1322. The second command synchronizes volume B 1332 (the secondary volume) with volume A 1320 (the primary volume). Once the synchronization is complete, the SNDR set will be in REPLICATING mode. From that time, all the input/output information sent to volume A 1320 will automatically be replicated to volume B 1332, and the content of both the volumes will be the same (that is, "mirrored").

The configuration process begins in step 1500 and proceeds to step 1502 where, from the command prompt at terminal 1300, the system manager issues the following command, or a similar command:

sndradm-C p s y n MySNDRSet Host_a Volume_a MetaInfoVolume_a Host_b Volume_b MetaInfoVolume_b Alternatively, the command can be generated from information entered into the GUI described above. In the discussion below, use of the CLI program is assumed. Those skilled in the art would know that the GUI disclosed above could also be used in an equivalent fashion. As set forth in step 1504, entry of the command, starts a Java Virtual Machine (JVM) for the SNDR CLI program 1304 and passes in necessary information, such as an identification of the host in which the CLI was issued (host A 1302), a port number for the Jiro™ service (typically 4160), the Jiro domain name in which the federated beans, including bean 1306, and management facades, including management facade 1316 are deployed (in this case jiro:Host_a) as well as the SNDR options used in sndradm command.

Next, in step 1506, the SNDR CLI program 1304 parses the command line options used while invoking the sndradm module. After parsing the options, the CLI program 1304 determines that the sndradm module was invoked to create a SNDR set (see Table 1). Since this operation will need to use the SNDR federated bean 1304, the CLI program 1304 uses a lookup service that is part of the Jiro program to get a proxy handle of the SNDR federated bean 1304 that is managing the SNDR data services 1318 on host A 1302 in the domain jiro:Host_a.

Once the SNDR CLI program 1304 locates the appropriate SNDR federated bean 1306 and retrieves the proxy handle to the bean 1306, in step 1508, the CLI program 1304 hands over the proxy handle and all other command line arguments passed in for SNDR set creation to a module or subprogram (realized by a Java class) that performs the rest of the specialized steps involved for SNDR set creation.

In step 1510, the SNDR CLI set creation module then calls the getSNDRBeanSystemManager( ) method on the SNDR federated bean proxy handle to retrieve a handle to the SNDRBeanSystemManager object which manages the overall SNDRSystem and provides APIs to create SNDR sets. The SNDR CLI set creation module then informs the SNDRBeanSystemManager of its intention to create a SNDR set using the user-provided parameters for different components of the SNDR set by calling the initializeSet( ) method of the SNDRBeanSystemManager( ) object with appropriate arguments.

In the initializeSet( ) method, in step 1512, the SNDRBeanSystemManager informs a data services federated bean (not shown in FIG. 13) running on host A 1302 about volume A 1320 in this host that the SNDR federated bean 1304 is going to use. The SNDRBeanSystemManager does that by calling a registerSVIVolume( ) method of the data services federated bean with appropriate volume names as arguments in order to register the volumes with the data services federated bean.

The process then proceeds, via off-page connectors 1514 and 1516 to step 1518 where, the SNDRBeanSystemManager object calls the getSNDRSystem( ) method of SNDR bean 1304. Inside the getSNDRSystem( ) method, SNDR bean 1304 contacts the SNDR management facade 1316 (indicated schematically by arrow 1314), retrieves a handle to the SNDRSystem object that the management facade 1316 is using as the manager of individual SNDR sets and groups, and returns the handle to the SNDRBeanSystemManager object.

Once the SNDRBeanSystemManager object gets the SNDRSystem handle from the management facade layer 1316, in step 1520, it asks the SNDRSystem object to create a SNDR set with the user provided data by calling the initializeset( ) method of the SNDRSystem object. This latter method call is at the management facade layer 1316 and, in the initializeSet( ) method, the task of set initialization gets delegated to another initialize( ) method of the SNDRManagerImpl, a module/subprogram implements the management facade SNDRSystem.

In step 1522, the SNDRManagerImpl initialize( ) method first performs several error checks. For example, it checks for the validity of the user provided data and whether the resulting SNDR set will violate any constraints, etc. If all the checks are passed, then a new SNDRSet object is created and added to the list of the SNDR sets managed by this SNDRManagerImpl. At this stage, the newly created SNDR set is in DISABLED state and the kernel does not yet know of this set.

If the manager indicated in the CLI command that the newly-created SNDR set should be enabled as well during the initialization step itself (as in the command referenced above), then, in step 1524, the SNDRManagerImpl object calls the enable( ) method of this newly-created SNDR set. In this enable( ) method, a set of native interface objects are created to communicate with the host A kernel. These native interface objects are populated with the appropriate SNDR set information and SNDR data services layer 1318 is requested to enable a SNDR set with the information passed through these native objects. The data services kernel layer 1318 then enables the set by updating/creating new internal kernel data structures. The enabled set goes into LOGGING mode immediately as host B might, or might not, be ready. (In the situation described now, the other side is actually not ready yet.) In any case, the kernel does not automatically try to enter REPLICATING mode by contacting the other host.

Next, in step 1526, after the new SNDR set is created and enabled, a handle to it is returned to the SNDRBeanSystemManager object. The SNDRBeanSystemManager then contacts a configuration manager federated bean running on host A (not shown in FIG. 13) in order to indicate that a new SNDR set has been created. The configuration manager federated stores the information related to this new SNDR set. This configuration information can be retrieved later.

In step 1528, the SNDRBeanSystemManger object contacts SNDR federated bean 1324 running on host B 1322 where the data in volume A 1320 will be replicated for this SNDR set. This contact is made, via network 1310, as indicated schematically by arrow 1308. The process then proceeds, via off-page connectors 1530 and 1532 to step 1534. In step 1534, an SNDR set is created and enabled on host B 1322. In particular, SNDR federated bean 1324 on host B 1322 creates and enables an SNDR set on host B 1322 by contacting the management facade 1330 as indicated by arrow 1326 and performing the process similar to that detailed in steps 1510 through 1526. During this process, the SNDR data service layer 1328 is used to create the new SNDR set.

At this point, a new SNDR set has been created and enabled at both hosts 1302 and 1322 and the CLI command issued in step 1502 has been completed. In order to start replication of I/O information destined for primary volume A 1320 to the secondary volume B 1332, primary volume 1320 and secondary volume 1332 need to be synchronized. Synchronization is achieved by using another CLI command. In particular, after completion of the first command, in step 1536, a system manager issues the following command on terminal 1300:

sndradm-c s MySNDRSet

When the command mentioned above is issued, the CLI program 1302 performs several steps similar to steps 1504–1508. These steps include, starting a Java Virtual Machine for the SNDR CLI program 1304 and passing in necessary information (step 1538), parsing the command line options and using the Jiro lookup service to get a proxy handle of the SNDR federated bean 1304 (step 1540) and handing over the proxy handle and all other command line arguments to a synchronization subprogram/module that actually performs the synchronization (step 1542.)

In step 1544 the synchronization module of the CLI program 1304 calls the getSNDRBeanSetManager( ) method on the proxy handle to the SNDR federated bean 1306 to retrieve a handle to the SNDRBeanSetManager object which manages the operations pertaining to individual SNDR sets.

The process then proceeds, via off-page connectors 1546 and 1548, to step 1550 where the synchronization module calls the fullSync( ) method of the SNDRBeanSetManager object for the appropriate SNDRSet. The fullSync( ) method of SNDRBeanSetManager object, in turn, calls the getSNDRSystem( ) method of SNDR bean 1306. Inside the getSNDRSystem( ) method, the SNDR bean 1306 contacts the SNDR management facade 1316, retrieves a handle to the SNDRSystem object that the management facade 1316 is using as the manager of individual SNDR sets and groups, and returns the handle to the SNDRBeanSetManger.

Then, in step 1552, the SNDRBeanSetManager object uses the handle to retrieve another handle to the appropriate SNDRSet by calling getSNDRSet( ) method on the SNDR-System object. After that, the fullSync( ) method on the retrieved handle of SNDRSet is called.

In the fullSync( ) method of the SNDR set, necessary objects in the native interface (not shown in FIG. 13) are set up for communication with the SNDR data services layers 1318 and 1328 in step 1554. In step 1556, the SNDR data service layer 1318 is then requested to synchronize the primary and secondary volumes through these native library objects and method calls. Once the synchronization is complete, the SNDR set goes to the REPLICATING mode and the process ends in step 1558. From this time on, all the I/O information destined for the primary volume 1320 will automatically be replicated to the secondary volume 1332 as well.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing remote data replication from a management terminal in a distributed computer system having a primary host with a first storage device connected by a network to a secondary host with a second storage device, the method comprising:

(a) running in the primary host a first federated SNDR bean;

(b) running in the secondary host a second federated SNDR bean that communicates, via the network, with the first federated SNDR bean;

(c) connecting the management terminal to the first federated SNDR bean and providing data replication commands from the management terminal to the first federated SNDR bean which thereupon controls the second SNDR federated bean;

(d) using the first federated SNDR bean to configure and manage the first storage device for data replication; and (e) using the second federated SNDR bean to configure and manage the second storage device for data replication.

2. The method of claim 1 wherein the primary host has an operating system with platform-dependent kernel routines and the first storage system is controlled by platform-dependent kernel routines in the operating system and wherein step (d) further comprises:

(d1) using a native interface to convert the platform-dependent kernel routines to platform-independent API calls.

3. The method of claim 2 wherein step (d) further comprises:

(d2) using the first federated SNDR bean to invoke the platform-independent API calls in order to configure the first storage.

4. The method of claim 1 wherein the secondary host has an operating system with platform-dependent kernel routines and the second storage system is controlled by platform-dependent kernel routines in the operating system and step (e) comprises: converting (e1) using a native interface to convert the platform-dependent kernel routines to platform-independent API calls.

5. The method of claim 4 wherein step (e) comprises:

(e2) using the second federated SNDR bean to invoke the platform-independent API calls in order to configure the second storage.

6. The method of claim 1 wherein step (c) comprises using a graphic user interface to control the first federated SNDR bean.

7. The method of claim 1 wherein step (c) comprises using a command line interface to control the first federated SNDR bean.

8. The method of claim 1 wherein step (a) comprises exporting a management interface from the first federated SNDR bean.

9. Apparatus for managing remote data replication from a management terminal in a distributed computer system having a primary host with a first storage device connected by a network to a secondary host with a second storage device, the apparatus comprising:

a first federated SNDR bean that runs in the primary host and has methods that configure and manage the first storage device for data replication; and;

a second federated SNDR bean that runs in the secondary host, communicates, via the network, with the first federated SNDR bean and has methods that configure and manage the second storage device for data replication; and an interface mechanism that connects the management terminal to the first federated SNDR bean and provides data replication commands from the management terminal to the first federated SNDR bean which thereupon configures and manage the first storage device and controls the second federated SNDR bean to configure and to manage the second storage device.

10. The apparatus of claim 9 wherein the primary host has an operating system with platform-dependent kernel routines and the first storage system is controlled by platform-dependent kernel routines in the operating system and the apparatus further comprises a first native interface that converts the platform-dependent kernel routines to platform-independent calls.

11. The apparatus of claim 10 further comprising a first management facade that runs on the primary host, has a platform-independent API and generates the platform-independent calls.

12. The apparatus of claim 11 wherein the first federated SNDR bean communicates with the first management facade to invoke calls in the platform-independent API in order to configure the first storage.

13. The apparatus of claim 9 wherein the secondary host has an operating system with platform-dependent kernel routines and the second storage system is controlled by platform-dependent kernel routines in the operating system and the apparatus further comprises a second native interface that converts the platform-dependent kernel routines to platform-independent calls.

14. The apparatus of claim 13 further comprising a second management facade that runs on the secondary host, has a platform-independent API and generates the platform-independent calls.

15. The apparatus of claim 14 wherein the second federated SNDR bean communicates with the second management facade to invoke the platform-independent API calls in order to configure the second storage.

16. The apparatus of claim 9 further comprising a graphic user interface that controls the first federated SNDR bean.

17. The apparatus of claim 9 further comprising a command line interface that controls the first federated SNDR bean.

18. The apparatus of claim 9 wherein the first federated SNDR bean exports a management interface.

19. A computer program product for managing remote data replication from a management terminal in a distributed computer system having a primary host with a first storage device connected by a network to a secondary host with a second storage device, the computer program product comprising a computer usable medium having computer readable program code thereon, including:

program code that runs a first federated SNDR bean in the primary host;

program code that runs in the secondary host a second federated SNDR bean that communicates, via the network, with the first federated SNDR bean;

program code that connects the management terminal to the first federated SNDR bean and provides data replication commands from the management terminal to the first federated SNDR bean which thereupon controls the second federated SNDR bean;

program code that uses the first federated SNDR bean to configure and manage the first storage device for data replication; and program code that uses the second federated SNDR bean to configure and manage the second storage device for data replication.

20. The computer program product of claim 19 wherein the primary host has an operating system with platform-dependent kernel routines and the first storage system is controlled by platform-dependent kernel routines in the operating system and the program code that uses the first federated SNDR bean to configure the first storage device comprises program code that converts the platform-dependent kernel routines to platform-independent API calls.

21. The computer program product of claim 20 wherein program code that uses the first federated SNDR bean to configure the first storage device comprises program code that uses the first federated SNDR bean to invoke the platform-independent API calls in order to configure the first storage.

22. The computer program product of claim 19 wherein the secondary host has an operating system with platform-dependent kernel routines and the second storage system is controlled by platform-dependent kernel routines in the operating system and the program code that uses the second federated SNDR bean to configure the second storage device comprises program code that converts the platform-dependent kernel routines to platform-independent API calls.

* * * * *